US012627128B2

(12) United States Patent
Thomas et al.

(10) Patent No.: US 12,627,128 B2
(45) Date of Patent: May 12, 2026

(54) NONMETALLIC SPLIT CONDUIT BODY

(71) Applicant: ABB Schweiz AG, Baden (CH)

(72) Inventors: Mathew Thomas, Collierville, TN (US); Matthew Garrison, Portland, TN (US); Darriel P. McCaffery, Gallitan, TN (US)

(73) Assignee: ABB Schweiz AG, Baden (CH)

( * ) Notice: Subject to any disclaimer, the term of this patent is extended or adjusted under 35 U.S.C. 154(b) by 173 days.

(21) Appl. No.: 18/402,078

(22) Filed: Jan. 2, 2024

(65) Prior Publication Data

US 2025/0219369 A1    Jul. 3, 2025

(51) Int. Cl.
*H02G 3/06* (2006.01)
*H02G 3/08* (2006.01)

(52) U.S. Cl.
CPC .............. *H02G 3/06* (2013.01); *H02G 3/081* (2013.01)

(58) Field of Classification Search
CPC ................................. H02G 3/06; H02G 3/081
USPC .......................................................... 174/481
See application file for complete search history.

(56) References Cited

U.S. PATENT DOCUMENTS 733,568 A * 7/1903 Sundh .................... H02G 3/088
174/541
1,650,233 A * 11/1927 Plunkett ............... H02G 3/0616
174/541

5,700,977 A * 12/1997 Ford ...................... H02B 1/202
174/64
6,527,302 B1 * 3/2003 Gault ...................... F16L 41/03
285/125.1
7,109,416 B1 * 9/2006 Reed .................... H02G 15/113
174/53
7,446,266 B1 11/2008 Gretz
8,376,411 B2 * 2/2013 Newby ................. F16L 55/172
29/463
2003/0034649 A1 * 2/2003 Gault ..................... H02G 3/086
285/125.1
2011/0057440 A1 * 3/2011 Newby ................. F16L 55/172
285/154.4

OTHER PUBLICATIONS

Southwire Company, LLC, "EZLB," product brochure, 1 p. (2021).

* cited by examiner

*Primary Examiner* — Timothy J Thompson
*Assistant Examiner* — Michael F McAllister
(74) *Attorney, Agent, or Firm* — Fitch Even Tabin & Flannery LLP

(57) ABSTRACT

A conduit body is provided. The conduit body includes a first body of the conduit body including a first coupling surface, a first hub configured to receive a further conduit on a first side of the conduit body, and a first port on the first side of the conduit body; and a second body of the conduit body including a second coupling surface, a second hub complimentary to the first hub configured to receive the further conduit on the first side of the conduit body, and a second port on the first side of the conduit body complimentary to the first port. The first hub is configured to couple to the second hub, and the first coupling surface is configured to couple to the second coupling surface to such that the first body is coupled to the second body.

19 Claims, 25 Drawing Sheets

1600

1604

1634

1622

1614

1606

1602

1634

1614

1604

NONMETALLIC SPLIT CONDUIT BODY

FIELD

The present invention is directed to conduit systems and conduit piping.

BACKGROUND

Nonmetallic rigid conduits (e.g., schedule 40 and schedule 80 conduits) are frequently used for installing electrical cables in buildings. As the conduits are laid out through the building, a conduit body can be used to allow for changes in directions and splitting of circuits. The conduit body can house the wiring, splices, and wiring devices, and provide access through a cover. The hub of a conduit body can help attach the conduits to the conduit body. A polyvinyl chloride (PVC) conduit body generally uses a threadless conduit hub where the conduits can be attached with PVC cement potentially providing a leak-proof permanent connection.

Generally, as shown in FIG. 1, conduit hubs 100 and 150 are molded as a single piece body 102, 152 with a single piece 360 degree circular surface 104, 154 on the hub enabling the conduits to be entered through the opening from the side. However, nonmetallic conduits and conduit bodies can be easily damaged for various reasons such as hand tools or power tools hitting the conduits during construction activities. Moreover, such damage (e.g., a hole or crack on the conduit body or conduit) might not be realized until after installation has occurred.

If a conduit system becomes damaged, the damaged conduit should be replaced without delay (e.g., to avoid ingress of water into the conduit system or manufacturing downtime). With the design of FIG. 1, when a user needs to replace a broken conduit body, they may need to pull the existing wiring after shutting down the electricity. This can result in equipment downtime and high labor costs. Additionally, cables routed through the conduits can get damaged and may need to be spliced together after installation. Such a replacement of wiring can also require the electricity to be turned off and the wires to be pulled out from the conduits by disassembling the end connections of the wiring. However, this can be very labor intensive and can create equipment downtimes.

SUMMARY

When a broken conduit body needs to be repaired, a split conduit body according to aspects of the present disclosure can be used. For example, the conduit joined to the broken conduit body can be cut at the intersection with the hub of the damaged conduit body without removing or damaging the wiring inside the PVC conduit and/or the broken conduit body. The end of the undamaged conduits can then be prepared. For instance, the end of the undamaged conduits can be cleaned to avoid any sharp edges and burrs (e.g., using a suitable cleaning solution or primer to chemically clean the end of the conduits), and after the conduit ends are cleaned and ready, PVC cement can be applied to the conduit ends. The conduit ends can then be placed on a partial hub of a top or bottom half of the split conduit body. After all the conduits that are required to be connected are properly seated on the bottom half of the conduit body, the corresponding bottom or top half of the split conduit body can be placed over the conduit and the screws provided can be used to tighten the bottom and top half of the conduit bodies. Therefore, aspects of the present disclosure can provide a split conduit body that provides the much-needed ease of installation for the several installation issues existing in the industry.

Additionally, and/or alternatively, the material of the conduit (e.g., the wiring) can be arranged in the bottom half of the conduit and the top half of the conduit can be placed over the conduit, and the PVC conduit can be inserted into the hub of assembled split conduit body. The top body can then be coupled (e.g., fixed, screwed) to the bottom body before or after joining the PVC conduit to the conduit body. A "C" style conduit body can also be used to repair cracked or damaged straight conduit runs. In addition to repairing the broken conduits, a split conduit body can be used as a junction box to splice damaged wiring.

In one aspect, a conduit body is provided. The conduit body comprises a first body of the conduit body comprising a first coupling surface, a first hub configured to receive a further conduit on a first side of the conduit body, and a first port on the first side of the conduit body; and a second body of the conduit body comprising a second coupling surface, a second hub configured to receive the further conduit on the first side of the conduit body complimentary to the first hub, and a second port on the first side of the conduit body complimentary to the first port. Further, the first hub is configured to couple to the second hub, and the first coupling surface is configured to couple to the second coupling surface such that the first body is coupled to the second body.

Example aspects may include one of the following features, or any combination thereof. For instance, in some examples of the conduit body, the first body further comprises a first main body, the first main body comprising the first port on the first side of the conduit body and the first hub being integrally formed with an edge of the first port on the first side of the conduit body and projecting away from the first port. In some examples, the second body further comprises a second main body, the second main body comprising the second port on the first side of the conduit body and the second hub being integrally formed with an edge of the second port on the first side of the conduit body and projecting away from the second port. Further, the second hub can be configured to be affixed to the first hub.

In some instances, the first hub and the second hub comprise a same first inner wall radius in a first portion of the first hub and the second hub, and a same second inner wall radius in a second portion of the first hub and the second hub.

In some variations, the first body further comprises a third port and a first hub on a second side of the conduit body, and the second body of the conduit body further comprises a fourth port and a second hub on the second side of the conduit body. The first coupling surface is further configured to couple to the second coupling surface such that third port is coupled to the fourth port and the first hub is coupled to the second hub on the second side.

In some examples, the first body is a top half of the conduit body and the second body is a bottom half of the conduit body, or the first body is a front half of the conduit body and the second body is a back half of the conduit body.

In some instances, the conduit body further comprises a gasket, and the first coupling surface is configured to couple to the second coupling surface while applying a force to the gasket.

In some variations, the first body comprises an opening on a third side, and the conduit body further comprises a cover configured to couple to the first body on the third side and cover the opening.

In some examples, the first body further comprises a first connection anchor configured to receive a screw, and the second body further comprises a second connection anchor configured to receive the same screw.

In some instances, the first body further comprises a first main body, wherein the first main body is affixed to the first hub at a first port connection surface, and the second body further comprises a second main body, wherein the second main body is affixed to the second hub at a second port connection surface.

In some variations, the first hub is configured to be affixed to the second hub to form an assembled hub.

In some examples, the first main body comprises a plurality of first ports, and the second main body comprises a complimentary plurality of second ports. Each first port is coupled to a respective second port to form a plurality openings in at least one lateral side of the conduit body.

In some instances, the conduit body further comprises at least one port cover, and the at least one port cover is affixed to at least one further first port connection surface and at least one further second port connection surface.

In some variations, a gasket is provided at the first port connection surface or the at least one further second port connection surface.

In some examples, the at least one port cover is interchangeable with the assembled hub.

A second aspect of the present disclosure provides a method for installing a conduit body. The method includes providing a material inside a first body of the conduit body comprising a first coupling surface and a first hub configured to receive a further conduit on a first side of the conduit body, the first body forming a first port on the first side of the conduit body. The method also comprises aligning, with the first body, a second body of the conduit body comprising a second coupling surface and a second hub complimentary to the first hub configured to receive the further conduit on the first side of the conduit body, the second body forming a second port on the first side of the conduit body complimentary to the first port. The method also comprises coupling the first hub to the second hub, and the first body to the second body, around the material using the first coupling surface and the second coupling surface to define an internal cavity within the first body and the second body.

Example aspects may include one of the following features, or any combination thereof. For example, the second aspect can further comprise coupling the first body to the further conduit by inserting the further conduit into the first hub of the first body; and coupling the second body to the first body and the further conduit.

In some variations, inserting the further conduit into the first hub further comprises inserting the further conduit into less than the full length of the first hub such that the further conduit abuts a conduit stop of the first hub, wherein the conduit stop defines a change in an internal cross section area of the first hub.

In some instances, the second aspect further comprises removing a first portion of the further conduit previously inserted into a previous hub; and preparing a remaining second portion of the further conduit. Coupling the first body to the further conduit by inserting the further conduit into the first hub of the first body further comprises inserting the remaining second portion into the first hub of the first body.

In some examples, the second aspect further comprises coupling the first hub to the first body at the first port on the first side of the first body; coupling the second hub to the second body at the second port corresponding to the first port on the same first side of the second body; and coupling a port cover to the first body at a third port on a second side of the first body and to the second body at a fourth port corresponding to the third port on the same second side of the second body.

In a third aspect, a system for replacing a conduit body is provided. The system comprises a material of the system, a further conduit, and a replacement conduit body. The replacement conduit body comprises a first body comprising a first coupling surface, a first hub on a first side of the conduit body, and a first port on the first side of the replacement conduit body, the first hub aligned with the first port and configured to receive a further conduit; and a second body comprising a second coupling surface, a second hub complimentary to the first hub on the first side of the conduit body, and a second port on the first side of the replacement conduit body complimentary to the first port, the second hub aligned with the second port and configured to receive the further conduit. The first coupling surface is configured to couple to the second coupling surface such that the first body is coupled to the second body. The further conduit corresponds in shape to an inner wall of the first hub and the second hub, and is configured to carry the material through the further conduit.

Further aspects of the present disclosure are provided in the present disclosure, and any of the first through twentieth aspects may be combined with any other features of the present disclosure disclosed herein.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
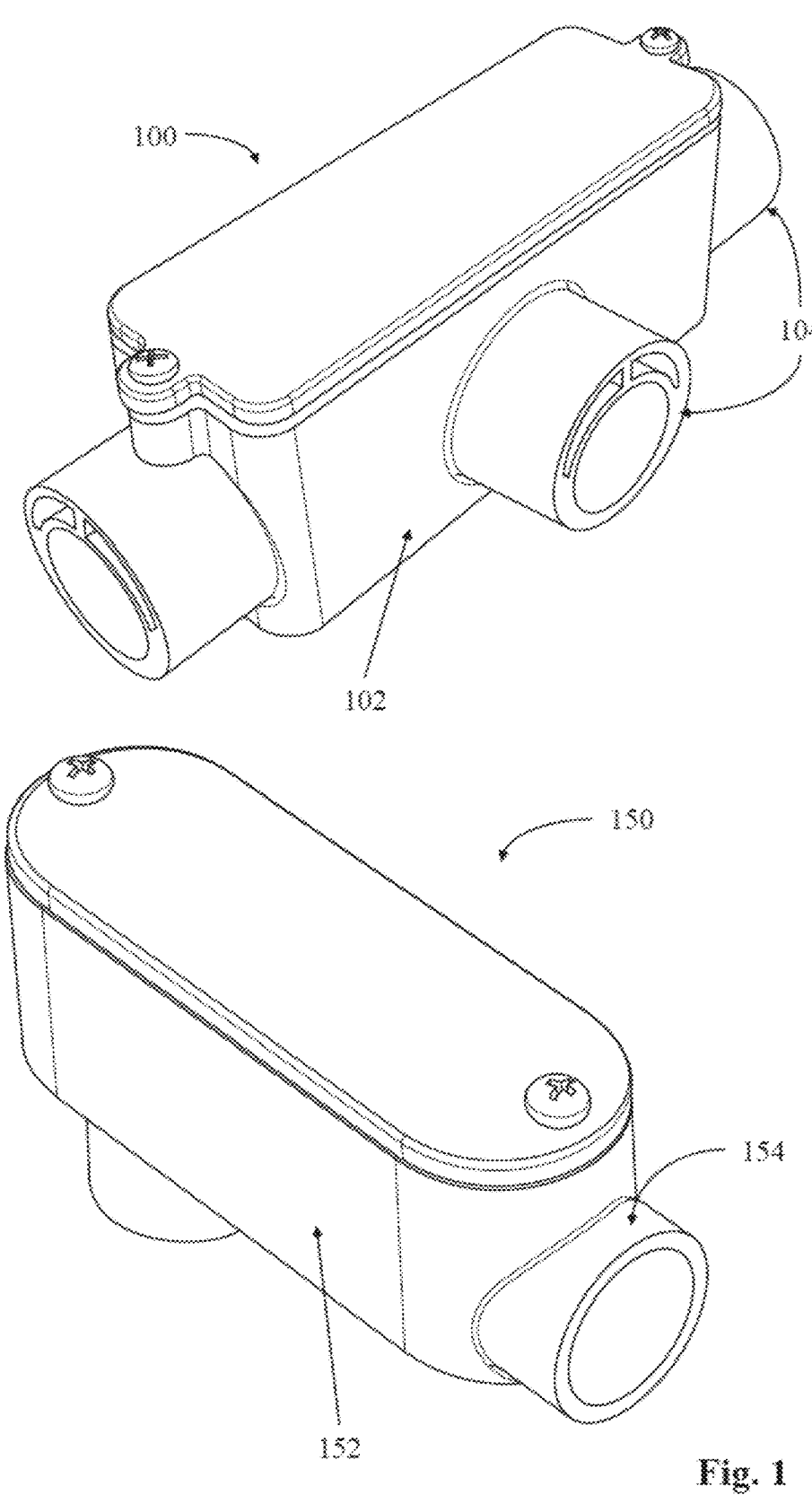
FIG. 1 provides an example of a conduit body using a single, unitary body and hub of the prior art.

The inventors of the present disclosure have recognized that a better conduit body system and/or design can be provided allowing for an easy-to-repair conduit body. As a result, aspects of the present disclosure provide split conduit bodies providing for the much-needed ease of installation for the several installation issues existing in the industry, such as reducing manufacturing downtime and/or potential further damage to other portions of a conduit system due to leakage from a breach of one initially damaged portion of the conduit system. Accordingly, aspects of the present disclosure provide many advantages. For example, aspects of the present invention can provide an easy-to-repair conduit body via a split conduit body constructed with at least two bodies (e.g., a body that is a top half of the assembled conduit and a body that is a bottom half of the assembled conduit). The split conduit body can include provisions to attach one or more covers to the main bodies (e.g., to the top half body or the bottom half body). Partial hubs of the split conduit body can each be of a semicircular cross-section construction, and when both the top and bottom bodies are joined together the assembled hub can become a full circular cross-section construction. The full circular cross-section of the assembled hubs can be joined with PVC conduits (e.g., using PVC cement) to create a leak-free joint between the split conduit body and the PVC conduits. Moreover, the split conduit body can facilitate easy repair work of a broken nonmetallic conduit body or a conduit system and facilitate the splicing of damaged wiring with less labor and time.

Examples of the presented disclosure will now be described more fully hereinafter with reference to the accompanying figures, in which some, but not all, example implementations of aspects of the present disclosure are shown. Indeed, implementations made according to aspects of the present disclosure may be exemplified in different forms and should not be construed as limited to the examples set forth herein; rather, these examples are provided as an aid to fully understanding the present disclosure. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Aspects of the present disclosure provide a conduit body (e.g., a nonmetallic conduit body) with a split design that can be used with different conduit systems (e.g., schedule 40 and schedule 80 rigid PVC). Aspects of the present disclosure provide split conduit body designs that can be used to repair broken conduit systems and/or splice the damaged wiring. A split conduit body can be constructed with a top and bottom piece with semicircular cross-section hubs that join to form a circular cross-section hub. The top and bottom pieces can be connected, and a gasket can be used in between them to form a leak-proof joint. Covers can be used to provide access to the inside of the conduit body.

Figure 2:
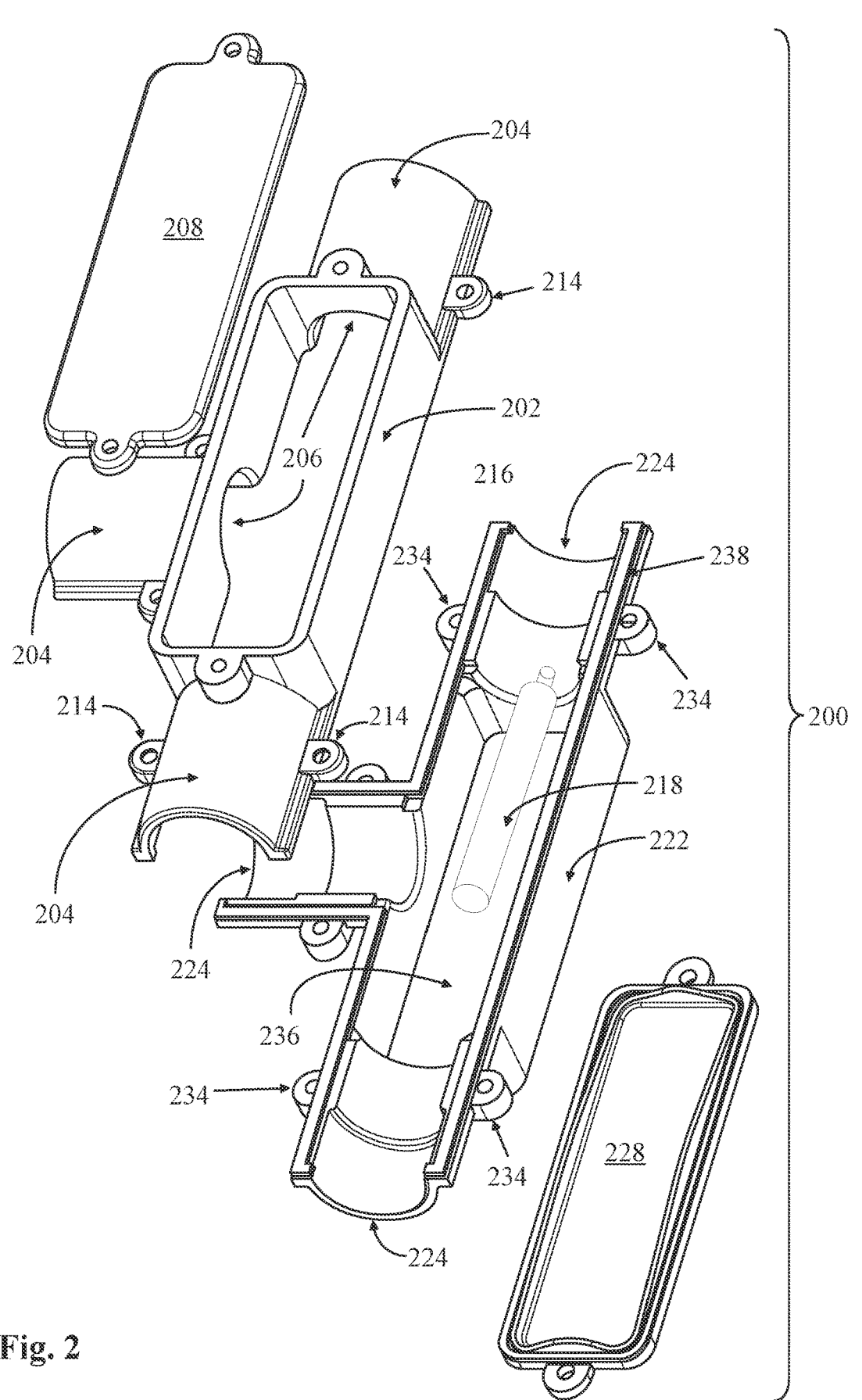
FIG. 2 illustrates an exploded view of a split conduit body according to an aspect of the present disclosure.

For example, FIG. 2 of the present application provides an example of a split conduit body 200. The split conduit body 200 can be assembled with top body 202 (e.g., a first body where top and bottom are arbitrary terms) and a bottom body 222 (e.g., a second body), and can utilize a cover 208 and a cover 228 for each respective body 202, 222. The top body 202 includes ports 206 in a semi-circular cross-section shape and hubs 204, which can be integral with the edges of ports 206 and project from and/or around the ports 206. The partial hubs 204 can be the same shape as the ports 206. Additionally, and/or alternatively, the inner side of partial hubs 204 can be shaped to correspond to the shape of a PVC conduit which the partial hubs 204 receive, whether the inner side of hubs 204 match the shape of the ports 206 or not. Additionally, and/or alternatively, hubs 204 can have an external cross-section shape (e.g., a half rectangle) that does not match an internal cross-section shape of the hubs 204 (e.g., a half circle). Similarly, the bottom body 222 can include ports 226, from which hubs 224 can be integral with and project outwards from, away from the bottom body 222.

The bottom body 222 and top body 202 can be coupled together (e.g., fastened, fixed) with one or more anchors 214 (e.g., flanges, bosses) of a top body 202 and one or more anchors 234 of a bottom body (e.g., configured to receive a bolt, pin, snap joint, and/or screw anchor as shown in FIG. 1), on the hubs 204 and 224 of the respective bodies 202 and 222. The anchors 214 may be smaller (e.g., thinner, shallower, shorter) than the corresponding anchors 234 to assist in installation (e.g. using a bolt, pin, snap joint, and/or screw anchor). For instance, each partial hub 204 can be provided with screw bosses for anchors 214 to enable the tightening of both the top body 202 and the bottom body 222 together. One of the partial hubs may have screw bosses with a clearance hole (e.g., unthreaded) for the screw to pass through. The screw boss on the corresponding partial hub may then have the holes provided with threads for a machine screw or unthreaded holes for a thread-forming screw to assemble with the mating partial hub. The anchors 214 may similarly incorporate snap designs or other suitable designs such as nuts and bolts. Additionally, and/or alternatively, designs can be constructed by changing the screw location to a main body of the bodies 202, 222 instead of the partial hubs 204, 224.

Additionally, and/or alternatively, the split conduit body 200 can include a gasket 238 positioned between the top body 202 and the bottom body 222. For example, the gasket 238 can be positioned on the coupling surface of the bottom body 222 or the top body 202, and when the top body 202 is coupled to the bottom body 222, the gasket can lie between the coupling surfaces (e.g., on the mating lip and/or flange 254 shown in FIG. 4B) of the two bodies. The gasket can thereby provide a reliable seal between the two bodies and for the split conduit body 200. The gasket 238 can also be put under pressure to increase the sealing effect (e.g., by tightening the bottom body 222 to the top body 202 using the anchors 214, 234). The applied pressure can compress the gasket 238, and provide further friction and/or compression forces to improve the seal between the coupling surfaces of the bottom body 222 and the top body 202. While the gasket 238 shown in FIG. 2 runs the perimeter of the bottom body 222, a gasket may be used for only portions of the split conduit body 200, or multiple gaskets 238 may be used for different portions, as needed. Additionally, and/or alternatively, the gasket 238 could be a foam-in-place gasket that is permanently attached to one or both of the bodies 202, 222, or the gasket can be a replaceable gasket positioned between the bodies 202, 222 of the split conduit body 200. A foam-in-place gasket can provide an advantage of ease of assembly for the installer by not requiring a positioning of the gasket in place while assembling the top and bottom bodies 202, 222. For example, the split conduit body 200 can simply be assembled by dispensing a liquid onto the coupling surface of either the bottom body 222 to the top body 202 and assembling the bottom body 222 to the top body 202. The dispensed liquid can then be distributed to cover the coupling surface (e.g., via compression of the dispensed liquid) and provide a seal between the bottom body 222 and top body 202, which can reduce the time and labor involved in accurately positioning a solid material gasket (e.g., gasket 238). However, while the foam-in-place gasket can be a more permanent gasket than a solid material gasket, a solid material gasket can be advantageous in the replacement or servicing of the split conduit body or material thereof. Alternatively, the top body 202 and bottom body 222 may be connected with or without anchors 214, 234 by using an adhesive (e.g., solvent cement) between the top body 202 and bottom body 222 with or without the gasket. Adhesive can thereby provide for adequate sealing against environmental elements.

Figures 5A, 5B:
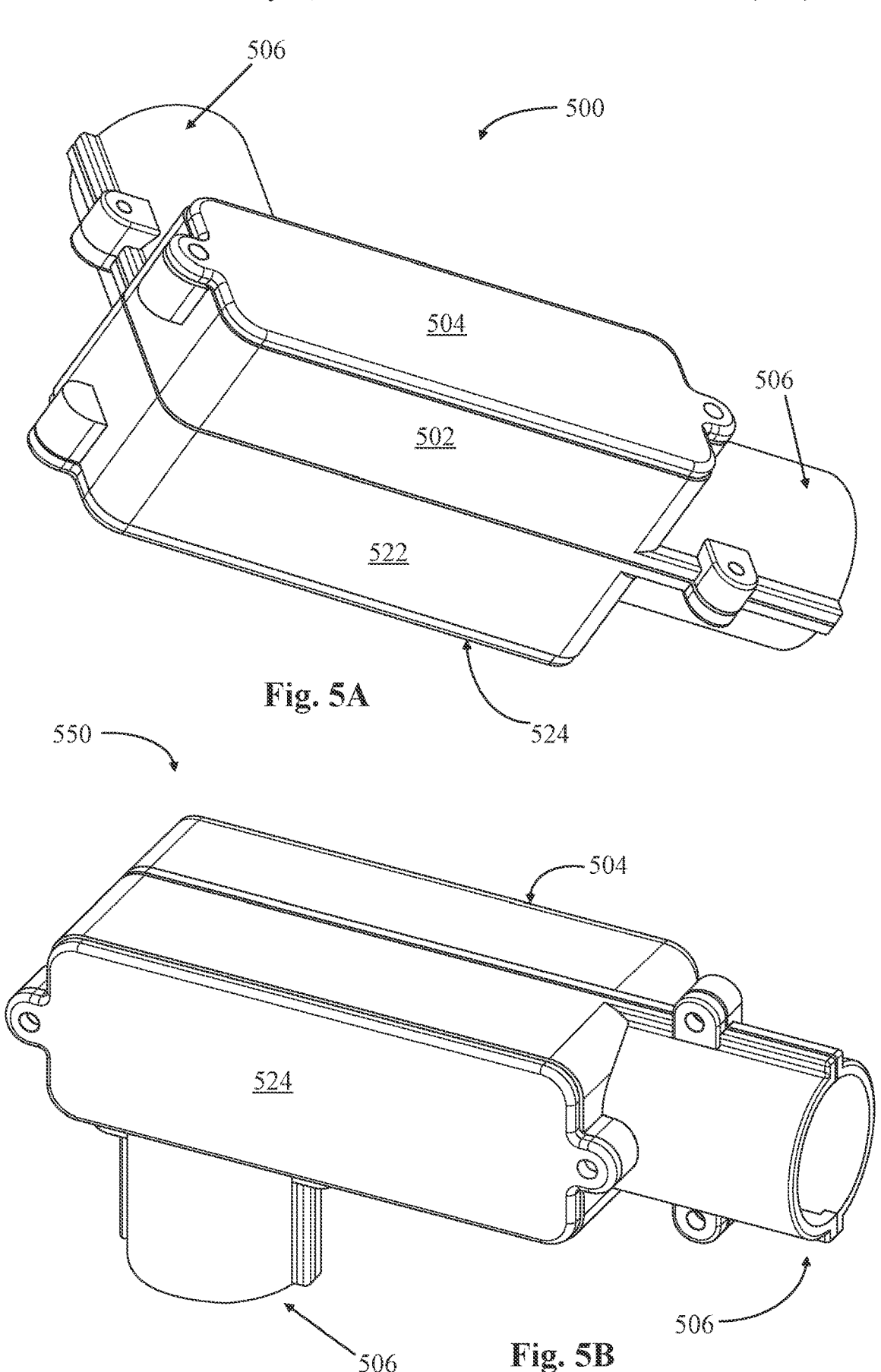
FIG. 5A illustrates an example of an LR-LB-body split conduit body oriented as an LR split conduit body according to an aspect of the present disclosure.
FIG. 5B illustrates an example of an LR-LB-body split conduit body oriented as an LB split conduit body according to an aspect of the present disclosure.

A removable cover 208 can also be fixed to the body 202, and a removable cover 228 can be fixed to the body 222, to provide a completely and releasably enclosed split conduit body 200 when the bodies 202, 222 include an opening 216, 236 (e.g., on a side other than the side that couples to the corresponding bottom body 222 or top body 202, respectively). The cover 208, 228 can provide for quick access to the material 218 (e.g., wiring, fluid) inside the split conduit body 200, for example after the split conduit body 200 has been installed or during instillation of the split conduit body 200. The cover 208, 228 can be permanently or removably secured to the bodies 202, 222 (e.g., using a bolt, pin, snap joint, and/or screw anchor 210, 230 or a sealant and/or adhesive). The split conduit body 200 may also include one cover (e.g., cover 208 but not cover 228), may include no cover, or may include additional covers on a further side of the bodies 202, 222. For instance, when the split conduit body 200 includes only one cover (e.g., cover 208), the body 222 may be permanently enclosed on the side opposite the cover 208 (e.g., would not include opening 236). A multiple cover split conduit body 200 can provide an advantage that access to the inside of the conduit body 200 can provided from either side of the conduit body 200 (e.g., from either body 202 or 222) allowing greater flexibility of installation. For example, allowing access from either side can allow for a split conduit body 200 of an LL or LR body (e.g., as shown in FIGS. 5A and 5B). A single cover split conduit body 200 can provide an advantage that less assembly may be required while still providing access to the inside of the conduit body 200.

Figure 3:
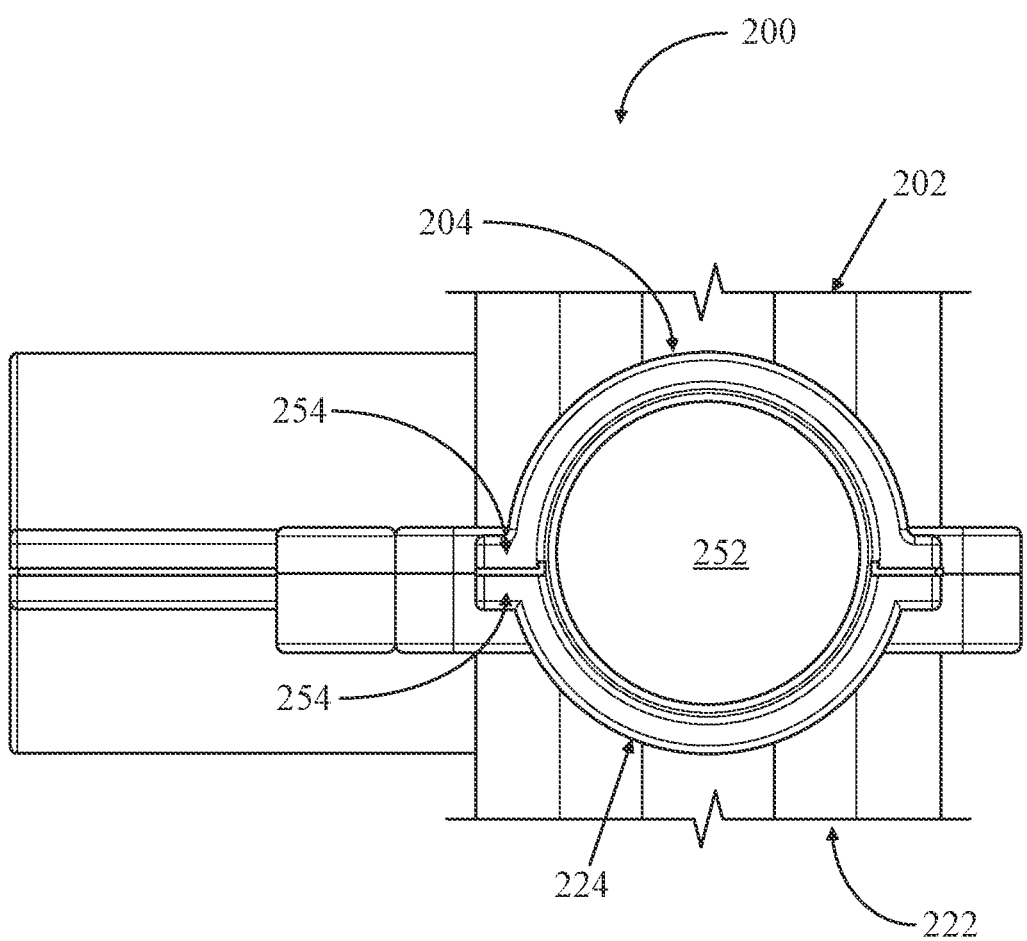
FIG. 3 illustrates a cutaway view of an assembled hub of a split conduit body according to an aspect of the present disclosure.

A cutaway of the assembled split conduit body 200 is shown in FIG. 3 in profile. The top body 202 and the bottom body 222 of FIG. 2 have been coupled at coupling surfaces 254, and a gasket 238 has been provided between the coupling surfaces 254. When assembled, the top hub 204 and the bottom hub 224 form a complete hub with a circular opening 252 (e.g., an opening with a circular cross-section). The shape of the opening 252 may match the shape of the conduit to be received (e.g., the circular shape of opening 252 may correspond to a circular PVC conduit), and may also correspond to the dimensions and shape of the outside of the conduit to be received. Moreover, the geometry and integrity of the coupling surfaces (e.g., the coupling surfaces for the partial hubs or the main bodies) can be provided such that an applied load can be distributed across other portions of the split conduit bodies, satisfying strength and safety requirements of an application.

Figure 4A:
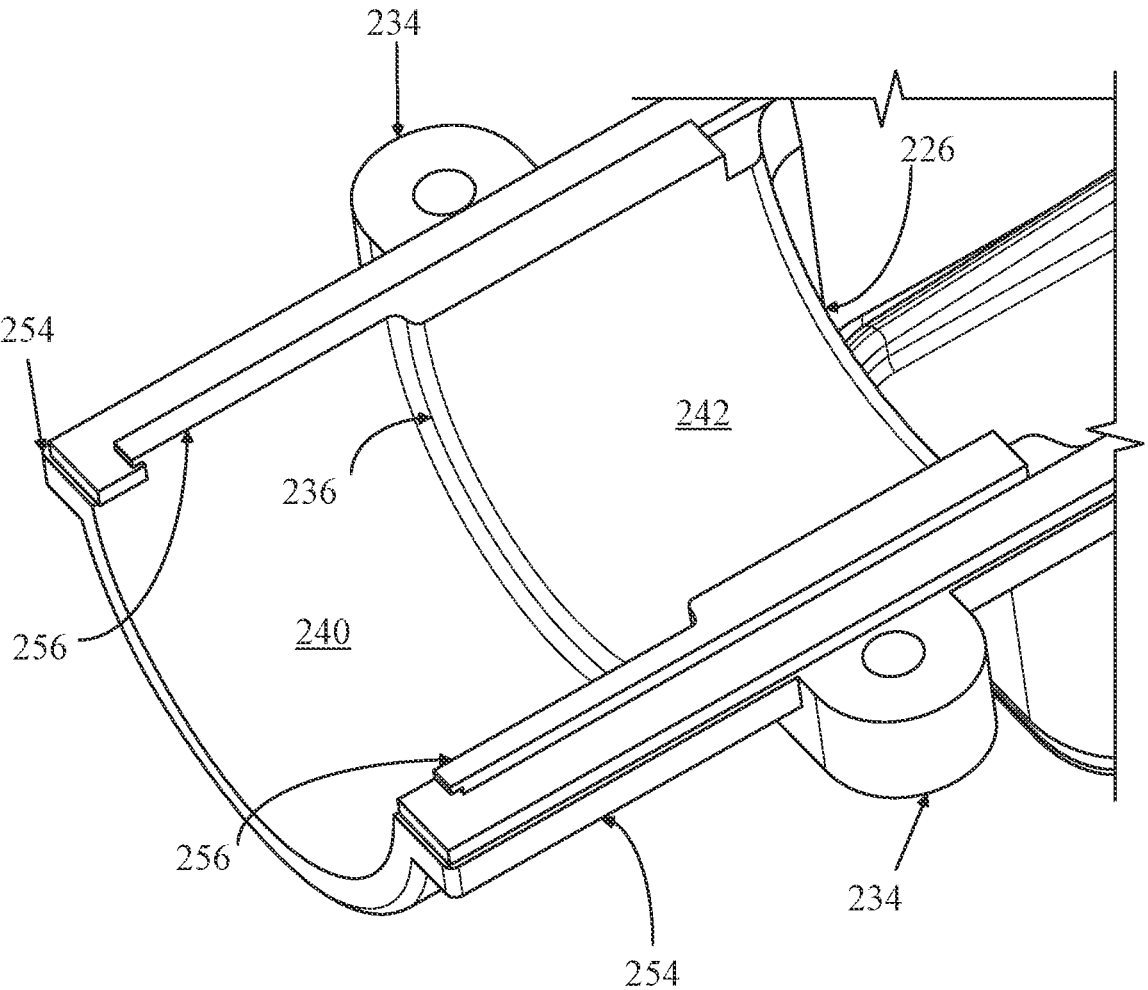
FIG. 4A illustrates a cutaway view of a hub of a bottom conduit body of a split conduit body according to an aspect of the present disclosure.
Figure 4B:
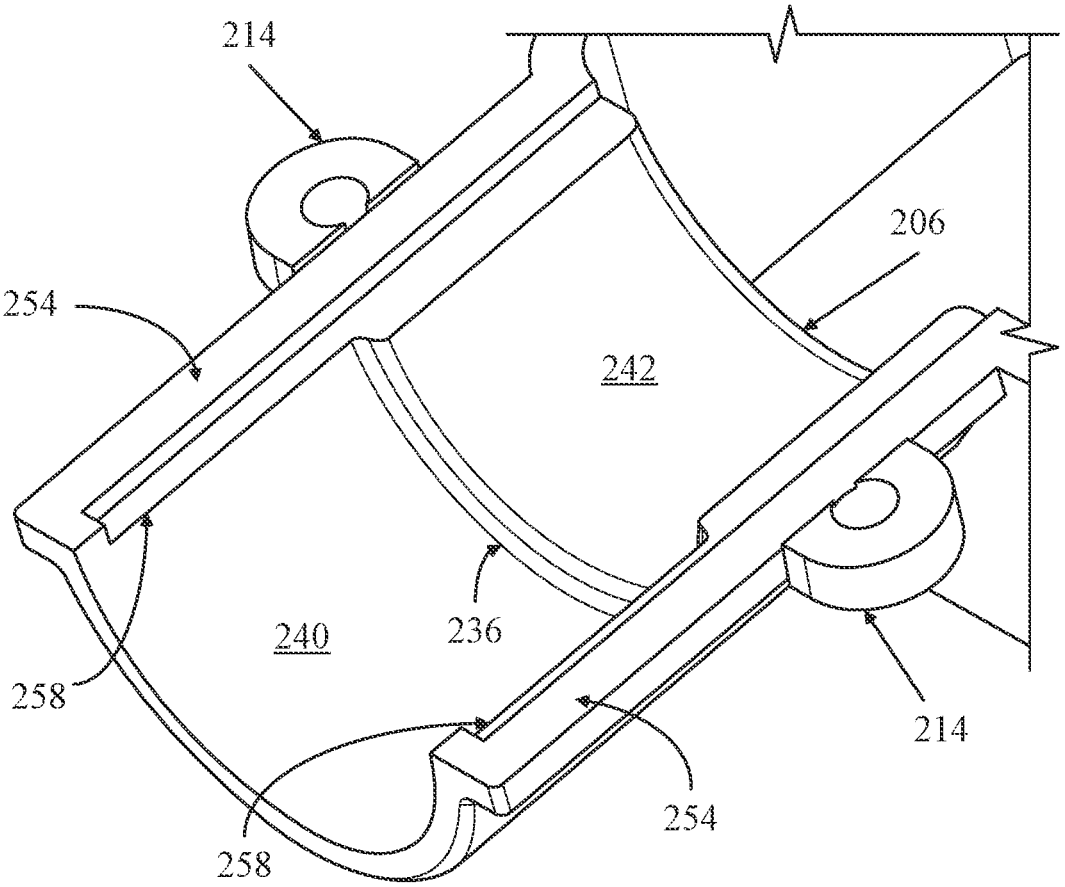
FIG. 4B illustrates a cutaway view of a hub of a top conduit body of the same split conduit body of FIG. 4A according to an aspect of the present disclosure.

FIGS. 4A and 4B provides a detailed view of partial hubs 224 and 204, respectively. The partial hub 224 of partial body 222 extends from the port 226 in the side of the partial body (e.g., bottom body 222), and partial hub 204 extends from the port 206. The partial hub 224 can have a semicircular shape (e.g., matching the port 226 and/or a PVC conduit to be received by the partial hub 224). The partial hubs 224, 204 can be constructed with a coupling surface 254 (e.g., a flange or end of a hub wall) on either side, which can enable sufficient wall thickness for the gasket 238 to sit and expand under a tightening force (e.g., aided by anchors 234 and 214). Partial hub 224 can be provided with a step 256 that, when partial hub 224 is assembled with partial hub 204, can sit on groove 258 of partial hub 204 enabling 360 degree contact of a received PVC conduit with the inner wall of the partial hubs 204 and 224 (e.g., can reduce contact between a received PVC conduit and gasket 238 or reduce a potential gap between assembled partial hubs 224, 204). The step 256 of partial hub 224 and the groove 258 of the partial hub 204 can be provided adjacent to a gasket 238 and/or between a received conduit and the gasket 238.

The partial hubs 204, 224 of the split conduit body 200 can be longer than (e.g., approximately twice) the length of a typical conduit body (e.g., twice the length of a hub 104, 154). For example, the increased length of the partial hubs 204, 224 can accommodate for a reduction in the length of a received conduit when a damaged conduit body is removed from the system and replaced by the split conduit body 200. When conduits are joined with conduit bodies permanently, the conduit length inserted into to the old conduit body 100 typically needs to be removed along with the damaged conduit body 100. Accordingly, to accommodate for these instances and replacement of conduit bodies, the partial hubs 204, 224 of the split conduit body can be advantageously provided with a conduit stop 235 (e.g., a raised wall) which separates a first portion 240 with a first inner radius from a second portion 242 with a reduced inner radius, which can help limit the length of a conduit received by the split conduit body 200. For example, when a hub 104 is removed, a to-be-received conduit inserted in the hub 104 can be cut where the conduit meets the hub 104, thereby removing a length of the conduit when the conduit body 100 is removed. When replacing the conduit body 100 with the split conduit body 200, the first portion 240 can receive the conduit and surround the conduit when the first inner radius is equal to an outer radius of the received conduit (e.g., with 360 degree contact to the outer walls of the received conduit). The received conduit can then be inserted up to the conduit stop 235 and abut the conduit stop. The second portion 242 can then, for instance, be equal in length to the removed portion of the received conduit (e.g., can be equal to the length of a hub 104) and may have the same inner radius as the received conduits inner radius and/or a smaller inner radius that the first portion 240, thereby replacing the removed portion of the received conduit. Installation of the split conduit body 200 can thereby be improved by potentially avoiding repositioning of the conduits affected by replacement of the conduit body 100.

Figure 4C:
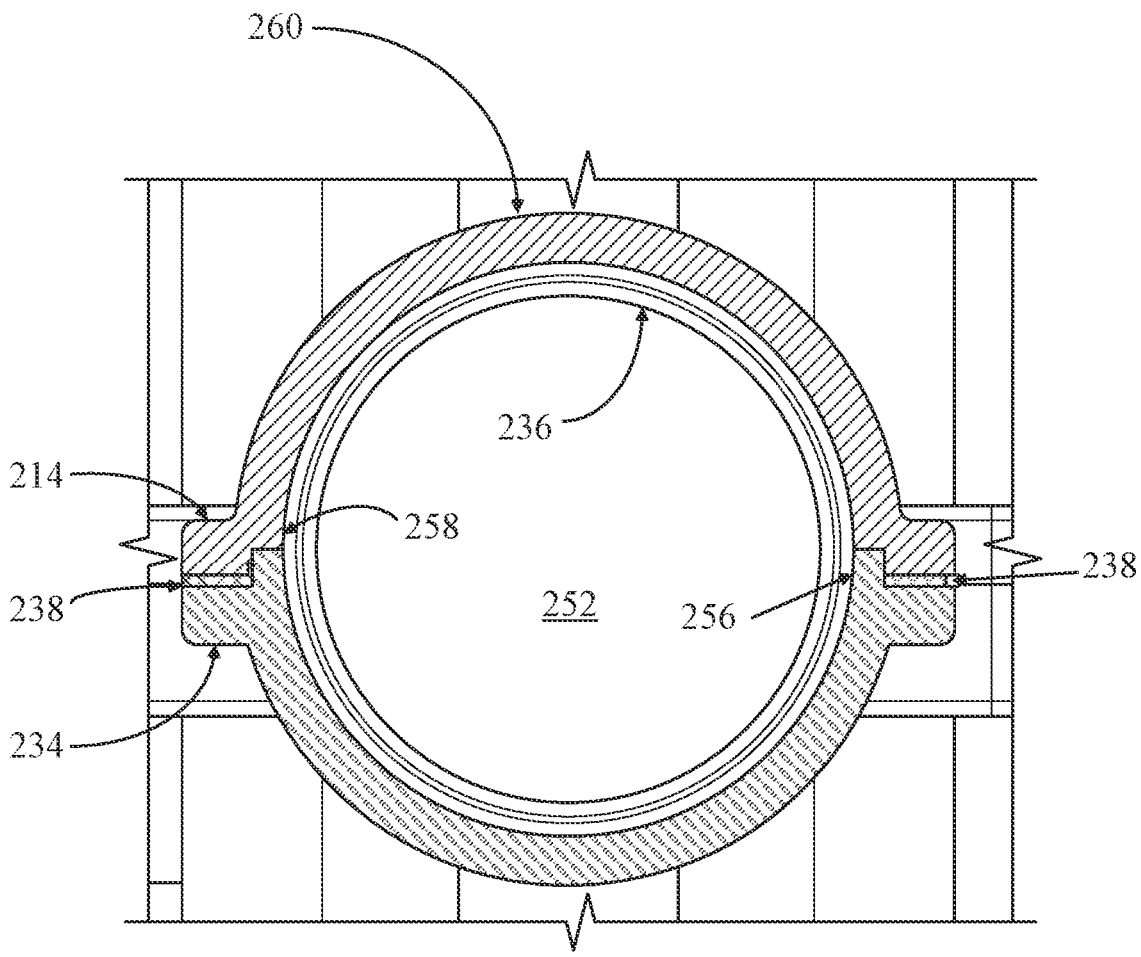
FIG. 4C illustrates a cutaway view of an assembled hub of the same split conduit body of FIG. 4A according to an aspect of the present disclosure.

When the partial hubs 204, 224 are assembled as shown in FIG. 4C, an opening 252 is provided that can receive a conduit. The partial hub 224 can interface with the partial hub 204 (e.g., by inserting the step 256 into the groove 258 and/or coupling the hubs with anchors 214, 234), and a conduit can be received on an inner side of the step 256. In FIG. 4C, a gasket 238 is provided on an outer side of the step 256. As a result, the gasket 238 can avoid contact with portions of a received conduit, which can provide for increased integrity and ease of installation. The conduit stop 235 can also be seen a continuous, concentric circle inside assembled hub 260 of a reduced inner diameter. However, while a continuous conduit stop 235 can provide for easier installation and a more reliable seal between the split conduit body 200 and the received conduit, the conduit stop 235 need not be continuous, and can comprise one or more projections (e.g., rigid or deformable in one direction posts disposed along the inner hub) inside the assembled hub (e.g., to prevent over insertion of a received conduit or aid a seal of the received conduit with the assembled hub 256).

The split conduit body according to example of the present disclosure can be provided in many different configurations (e.g., LB, C, LL, LR, T, and E) to achieve different directional changes in a conduit system, and can retain the advantages of the present disclosure in many different configurations. For example, in FIG. 5A, an LR configuration split conduit body 500 is provided. The split body 500 has a cover 504 at the front (e.g., for the body 502) and a cover 524 at the back (e.g., for the body 522). The design of split body 500 with two covers allows the split body 500 to be rotated and used as an LB version conduit body 550 (e.g., as shown in FIG. 5B). A material of the conduit system (e.g., a wiring) can then be accessed from either side of the split body 500. For instance, with the two covers 504 and 524, replacing the wiring (e.g., pulling the wires) can be done from the sides of the split body 500 rather than from the front of the LB split body 500. In other words, the wiring can be pulled from the split body 500 by removing the covers 504 and/or 524, rather than by pulling the wiring through the assembled hubs 506. Additionally, when both covers 504 and 524 are provided, both covers 504 and 524 allow pulling from either side of the conduit body allowing more flexibility. As a result, the two-cover design helps an LL or LR style split conduit body 500 to be rotated and installed as an LB split conduit body 550.

Figures 17A, 17B:
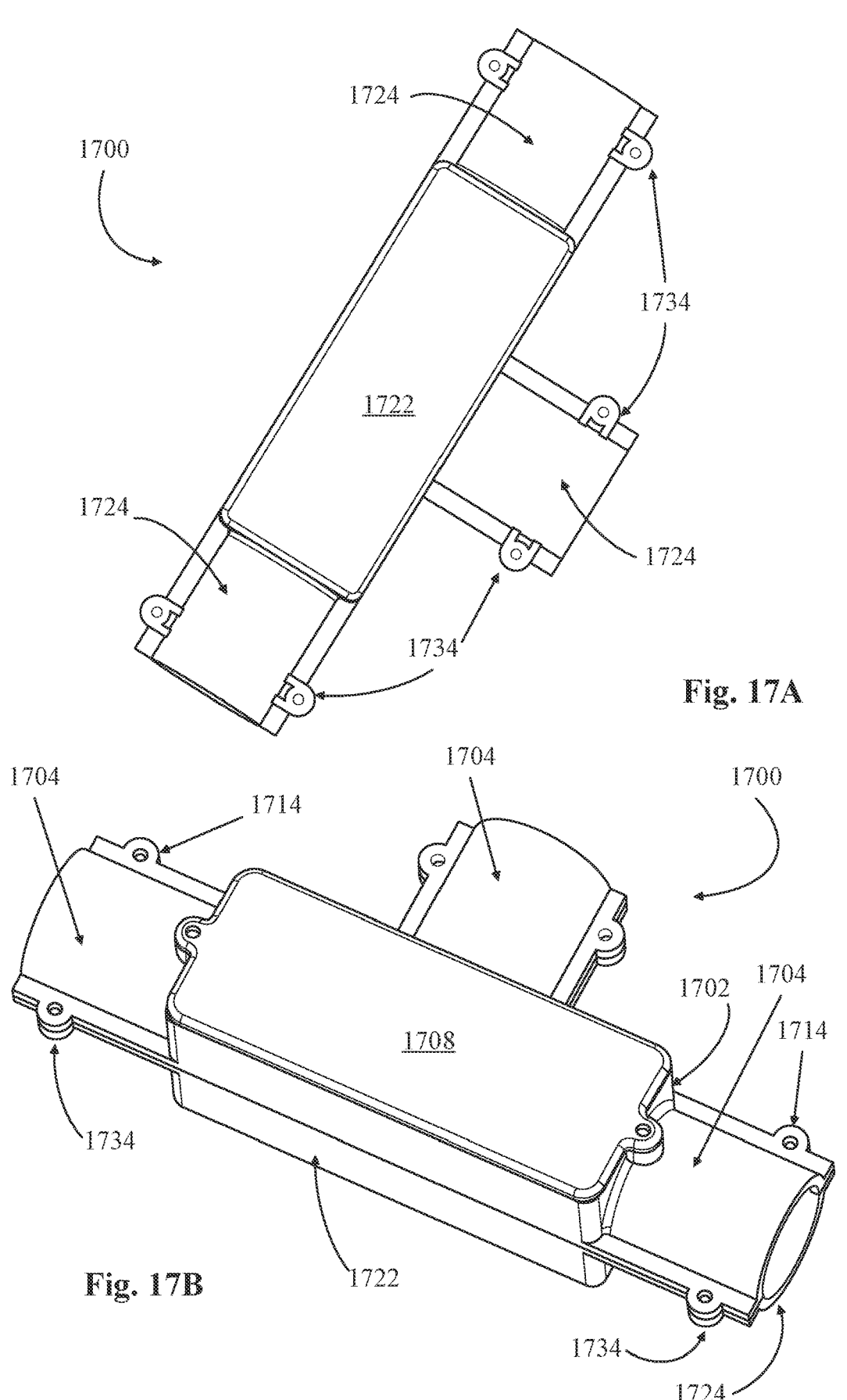
FIG. 17A illustrates an example of a T-body split conduit body with one cover according to an aspect of the present disclosure.
FIG. 17B illustrates a further view of the example of the T-body split conduit body of FIG. 17A.
Figure 18A:
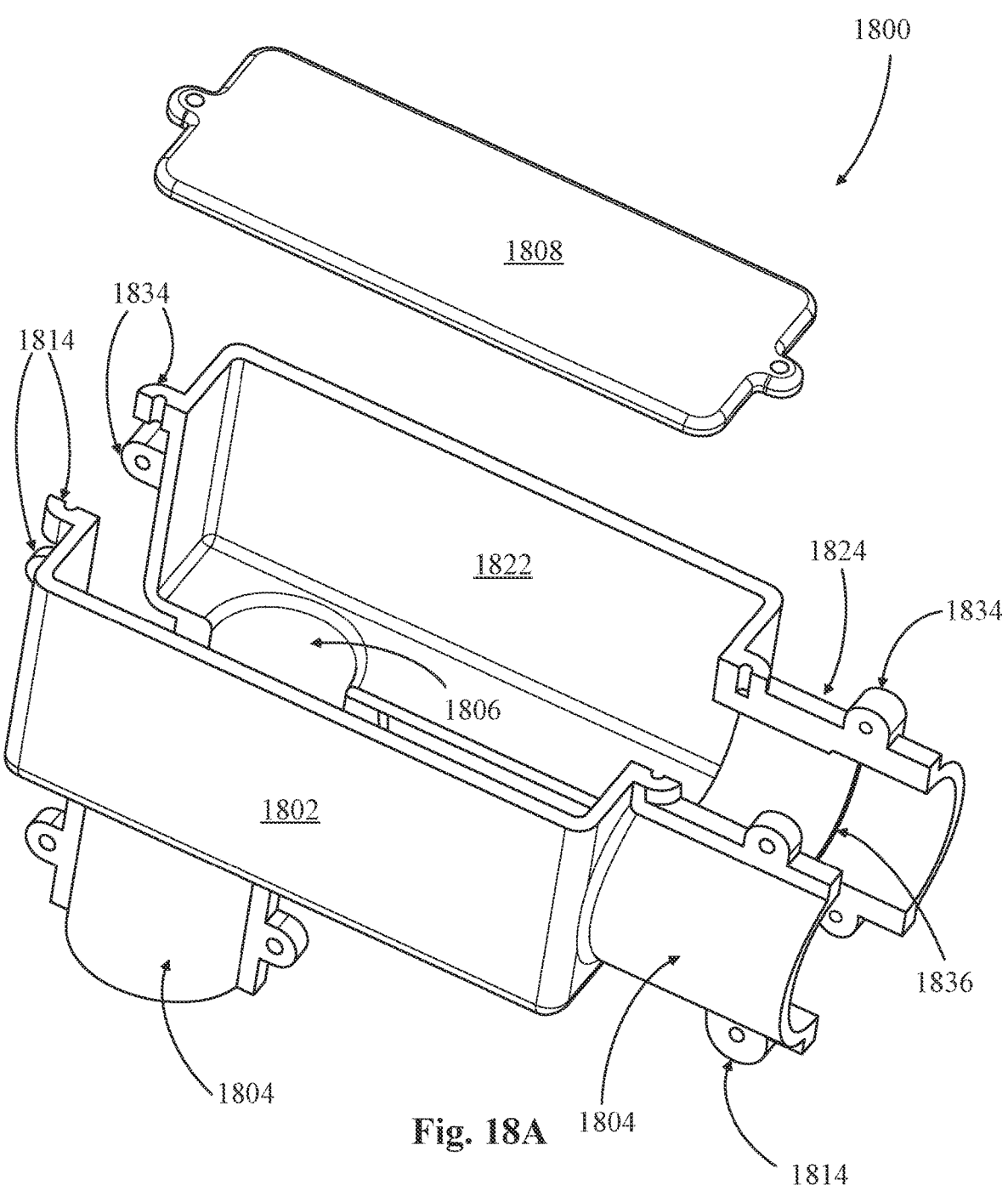
FIG. 18A illustrates an exploded view of an example of an LL-body split conduit body according to an aspect of the present disclosure.
Figure 18B:
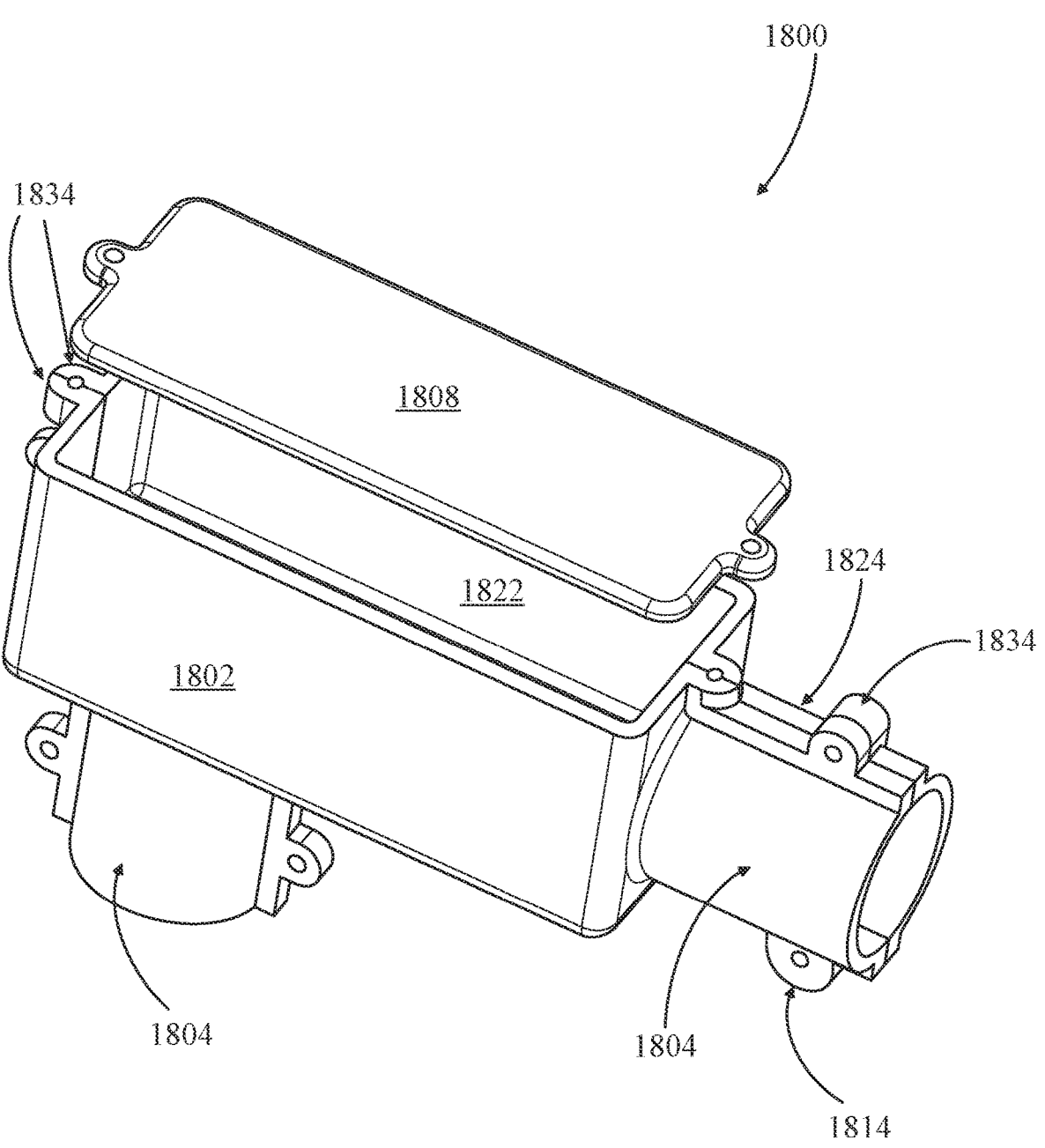
FIG. 18B illustrates a partially assembled view of the example of the LL-body split conduit body according to FIG. 18A.
Figure 18C:
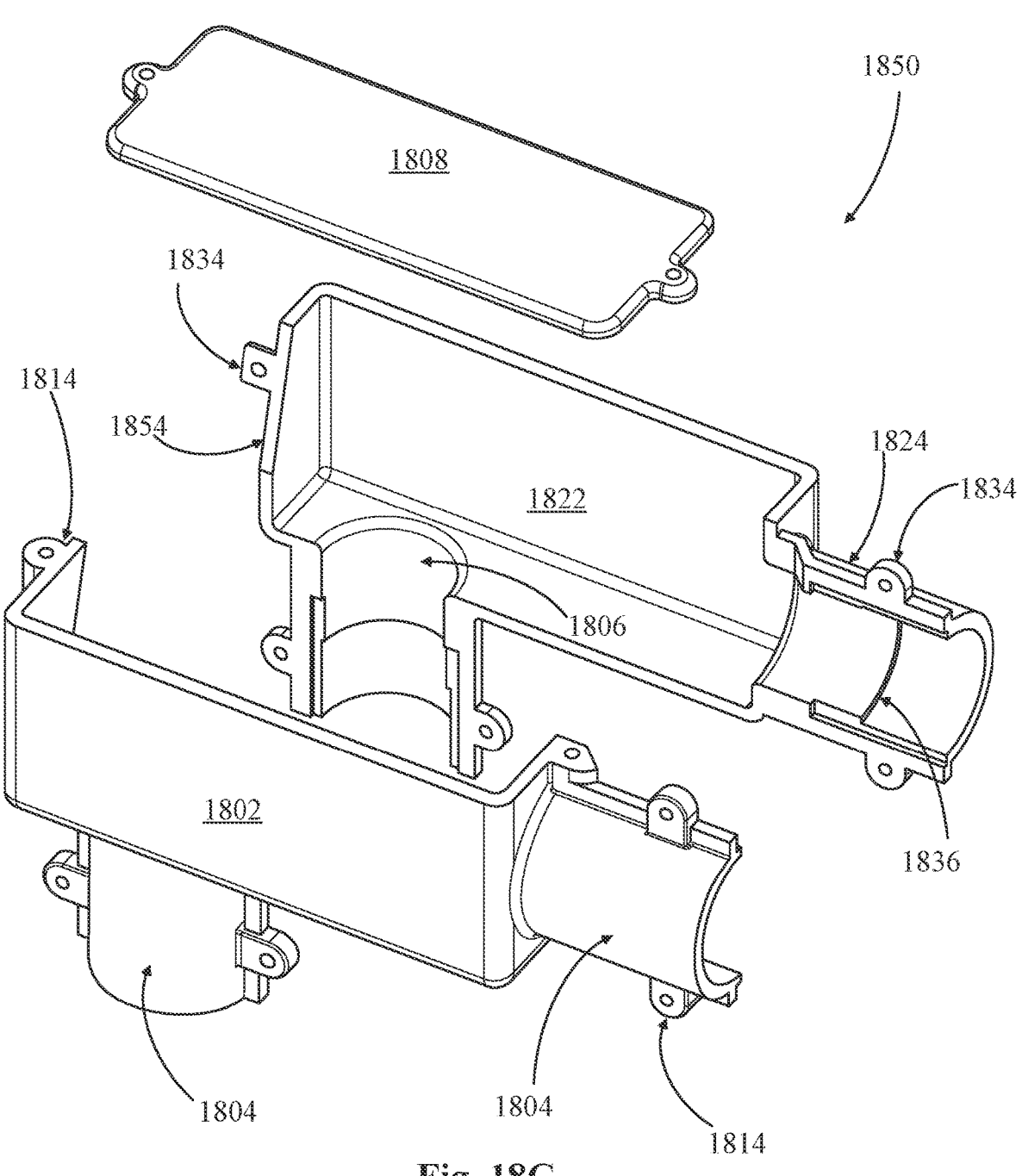
FIG. 18C illustrates an exploded view of a further example of an LL-body split conduit body according to an aspect of the present disclosure.

When one cover is provided, as shown in FIGS. 17A and 17B in T configuration split body conduit 1700 and FIGS. 18A-C in LL configuration split body conduits 1800 and 1850, an advantage can be provided that it may be easier to manufacture a split body that allows for material (e.g., the wiring) to be pulled from a different face (e.g., a front face) of the conduit rather than the sides of the split body conduit. For example, in split body conduit 1700 shown in FIGS. 17A and 17B, a top body 1702 and a bottom body 1722 are provided. Top body 1702 includes partial hubs 1704, a cover 1708, and anchors 1714 for coupling the top body 1702 to the bottom body 1722 as shown in FIG. 17A. Bottom body 1722 can be complimentary to partial body 1702, such that when bottom body 1722 is assembled with top body 1702, the coupling surfaces and anchors 1734 are provided in the same locations and/or such that bottom body 1722 can be mirror symmetrical to top body 1702. For example, partial hubs 1724 of the bottom body 1722 can be mirror symmetrical to the partial hubs 1704 of the top body 1702, such that a concentric circular hub can be provided when partial hubs 1704 and 1724 of respective partial bodies 1702 and 1722 are assembled together. However, as shown in FIG. 17B, bottom body 1722 does not include a cover, while top body 1702 includes a cover 1708.

Similarly, LL configuration split body conduit 1800 or 1850 can be provided with one cover on a side of the conduit body 1800 opposite an opening 1806 for a hub. Similar to split body 1700, a partial body 1802 can include partial hubs 1804 and anchors 1814, and a partial body 1822, complimentary to partial body 1802, can include partial hubs 1824 and anchors 1834. However, unlike split body 1700, both partial body 1802 and partial body 1822 can provide for a cover 1808, where each of partial body 1802, 1822 provide for complimentary, partial openings on the same side of split body 1800 to be covered by the cover 1808. As a result, as shown in FIG. 18B, the split body conduit 1800 can be easily assembled by coupling partial body 1802 to partial body 1822. Additionally, partial bodies 1802 and 1822 need not be perfectly symmetrical. For example, split body conduit 1850 provides an inclined coupling surface 1854, configured to couple to a corresponding inclined coupling surface of partial body 1802 extending towards coupling surface 1854.

Moreover, the anchors 1834 can take multiple forms, such as providing for a vertical to-be-received screw as in split body conduit 1800 or a horizontal to-be-received screw as in split body conduit 1850. While LL configuration split body 1800 has been illustrated accordingly, a single cover configuration and/or asymmetrical partial bodies may use separate constructions for each of the LB, LL and LR styles.

Figure 6:
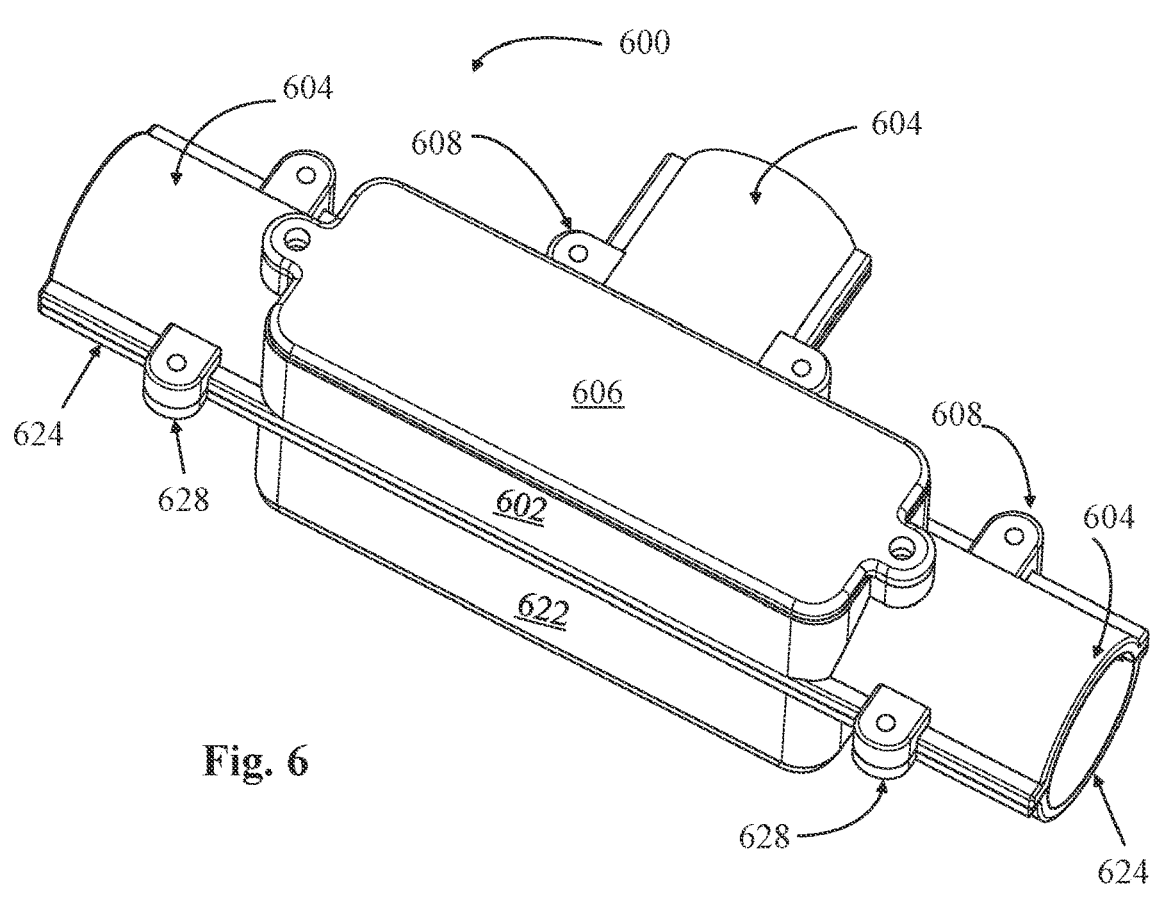
FIG. 6 illustrates an example of a T-body split conduit body according to an aspect of the present disclosure.

FIGS. 6-9 provide further examples of different configurations of split conduit bodies. In each example, a main body is provided, and the one or more hubs are provided in different positions with respect to the main body to achieve different configurations of the split conduit body. For example, FIG. 6 provides an assembled T configuration split conduit body 600 which can include a middle hub and two end hubs (e.g., a total of 3 hubs), which can be used for branch wiring. For instance, the split body 600 can include two partial bodies, 602 and 622. Partial body 602 includes partial hubs 604 and a cover 606. Partial body 622 can be complimentary to partial body 602, such that when partial body 622 is assembled with partial body 602, the coupling surfaces are provided in the same locations and/or such that partial body 622 can be mirror symmetrical to partial body 602. For example, partial hubs 624 of the partial body 622 can be mirror symmetrical to the partial hubs 604, such that a concentric circular hub can be provided when partial hubs 604 and 624 of respective partial bodies 602 and 622 are assembled together. Moreover, for the T configuration split conduit body 600, three partials hubs can be provided for each partial body 602, 622, with a first partial hub 604, 624 on a first end, a second partial hub 604, 624 on a second end opposite to the first end, and a partial hub 604 (and 624 underneath partial hub 604) perpendicular to the first and second partial hubs and projecting from a port in the middle of the partial bodies 602, 622. The partial body 602 can be assembled to the partial body 622 with the aid of anchors 608 and 628. One or more covers (e.g., cover 606) can also be utilized to provide increased flexibility in installation (e.g., allowing for rotation of the split body 600).

Figure 7:
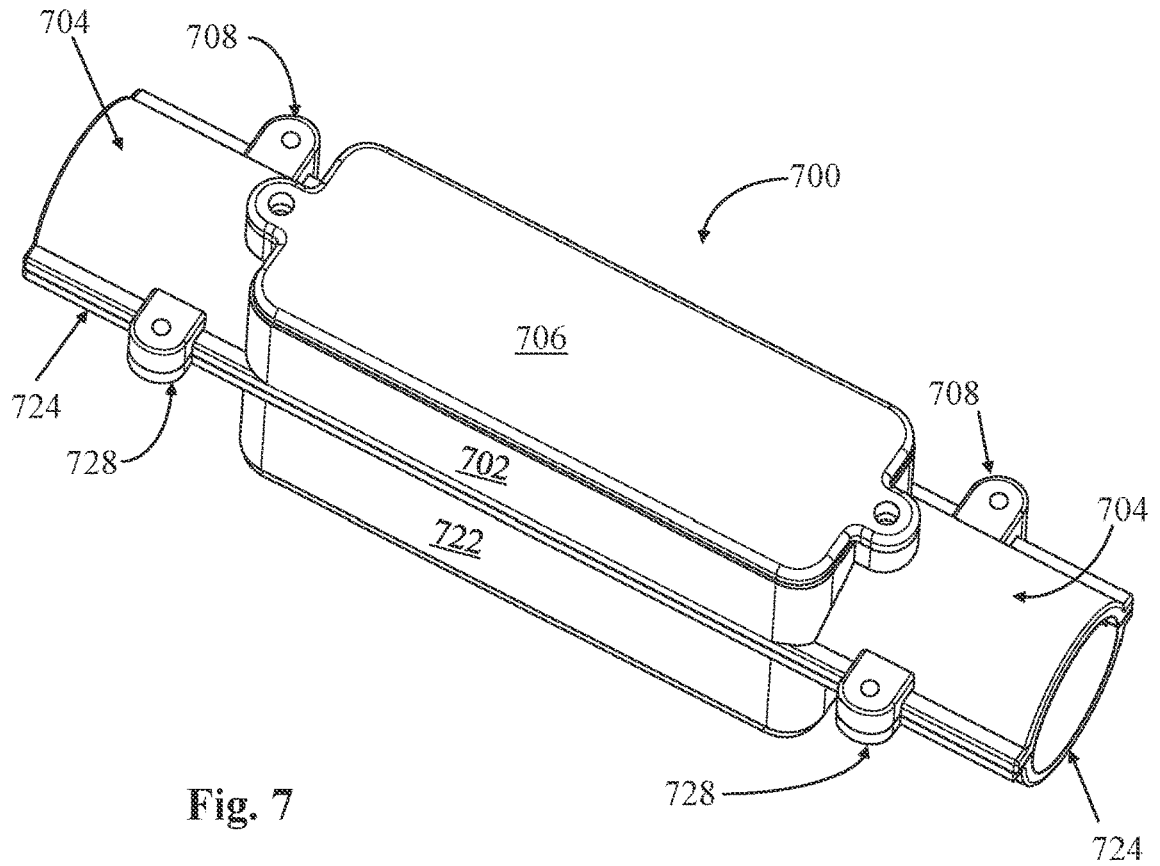
FIG. 7 illustrates an example of a C-body split conduit body according to an aspect of the present disclosure.

FIG. 7 provides an example of a C configuration split conduit body 700. A C configuration split conduit body 700 can provide end-to-end connection with two assembled hubs on opposite sides of the split body 700. For instance, the split body 700 can include two partial bodies, 702 and 722. Partial body 702 includes partial hubs 704 and a cover 706. Partial body 722 can be complimentary to partial body 702, such that when partial body 722 is assembled with partial body 702, the coupling surfaces are provided in the same locations and/or such that partial body 722 can be mirror symmetrical to partial body 702. For example, partial hubs 724 of the partial body 722 can be mirror symmetrical to the partial hubs 704, such that a concentric circular hub can be provided when partial hubs 704 and 724 of respective partial bodies 702 and 722 are assembled together. Moreover, for the C configuration split conduit body 700, two partial hubs can be provided for each partial body 702, 722, with a first partial hub 704, 724 on a first end, and a second partial hub 704, 724 on a second end opposite to the first end. The partial body 702 can be assembled to the partial body 722 with the aid of anchors 708 and 728. One or more covers (e.g., cover 706) can also be utilized (e.g., on either side of the split body 700).

Figure 8:
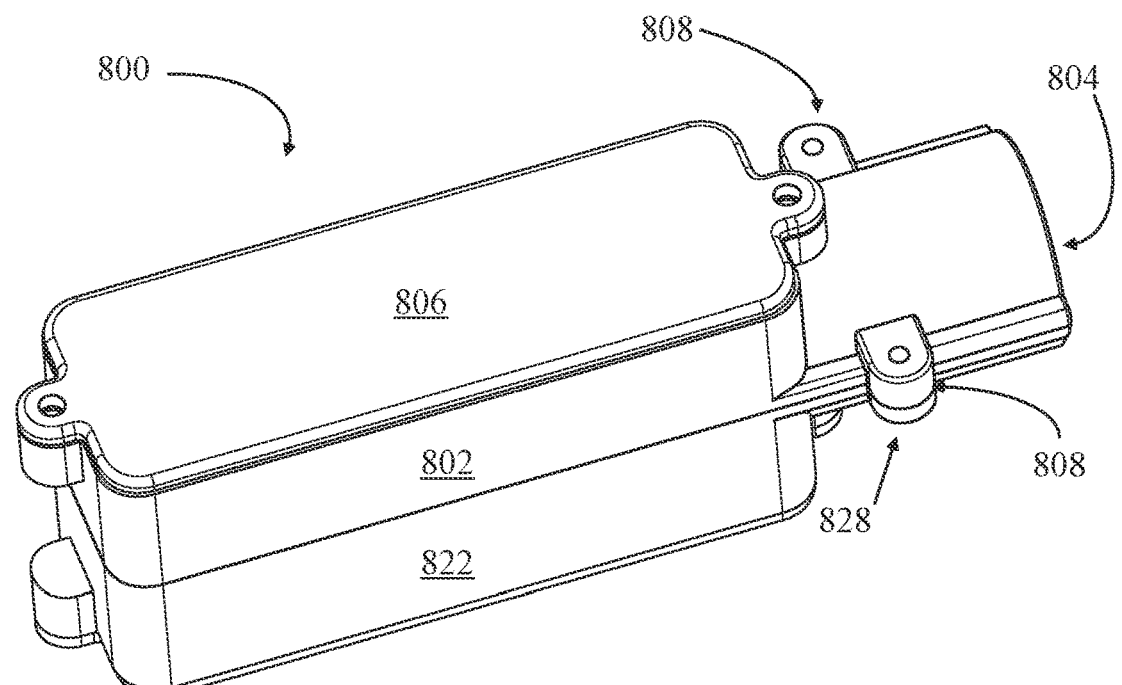
FIG. 8 illustrates an example of an E-body split conduit body according to an aspect of the present disclosure.

FIG. 8 provides an example of an E configuration split conduit body 800. A split conduit body 800 can include a single assembled hub in an E configuration, and can be used for termination of a conduit line. For instance, the split body 800 can include two partial bodies, 802 and 822. Partial body 802 includes partial hubs 804 and a cover 806. Partial body 822 can be complimentary to partial body 802, such that when partial body 822 is assembled with partial body 802, the coupling surfaces are provided in the same locations and/or such that partial body 822 can be mirror symmetrical to partial body 802. For example, a partial hub of the partial body 822 (beneath the partial hub 804) can be mirror symmetrical to the partial hubs 804, such that a concentric circular hub can be provided when the partial hubs of respective partial bodies 802 and 822 are assembled together. Moreover, for the E configuration split conduit body 800, a partial hub can be provided for each partial body 802, 822, with both partial hubs on a first end. The partial body 802 can be assembled to the partial body 822 with the aid of anchors 808 and 828. One or more covers (e.g., cover 806) can also be utilized (e.g., on either side of the split body 800).

Figure 16A:
FIG. 16A illustrates an example of an LU-body split conduit body according to an aspect of the present disclosure.
Figure 16B:
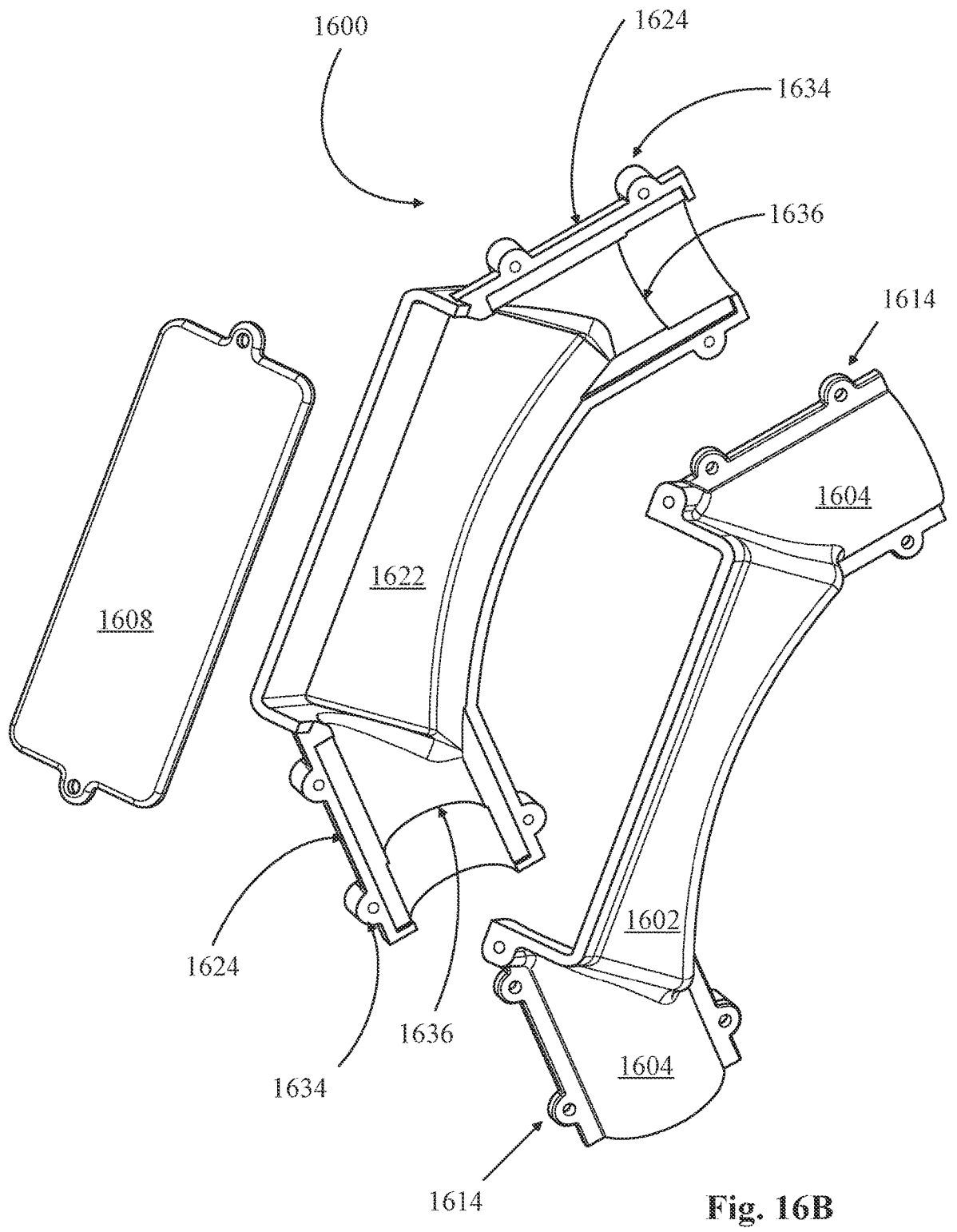
FIG. 16B illustrates an exploded view of the LU-body split conduit body of FIG. 16A.
Figure 16C:
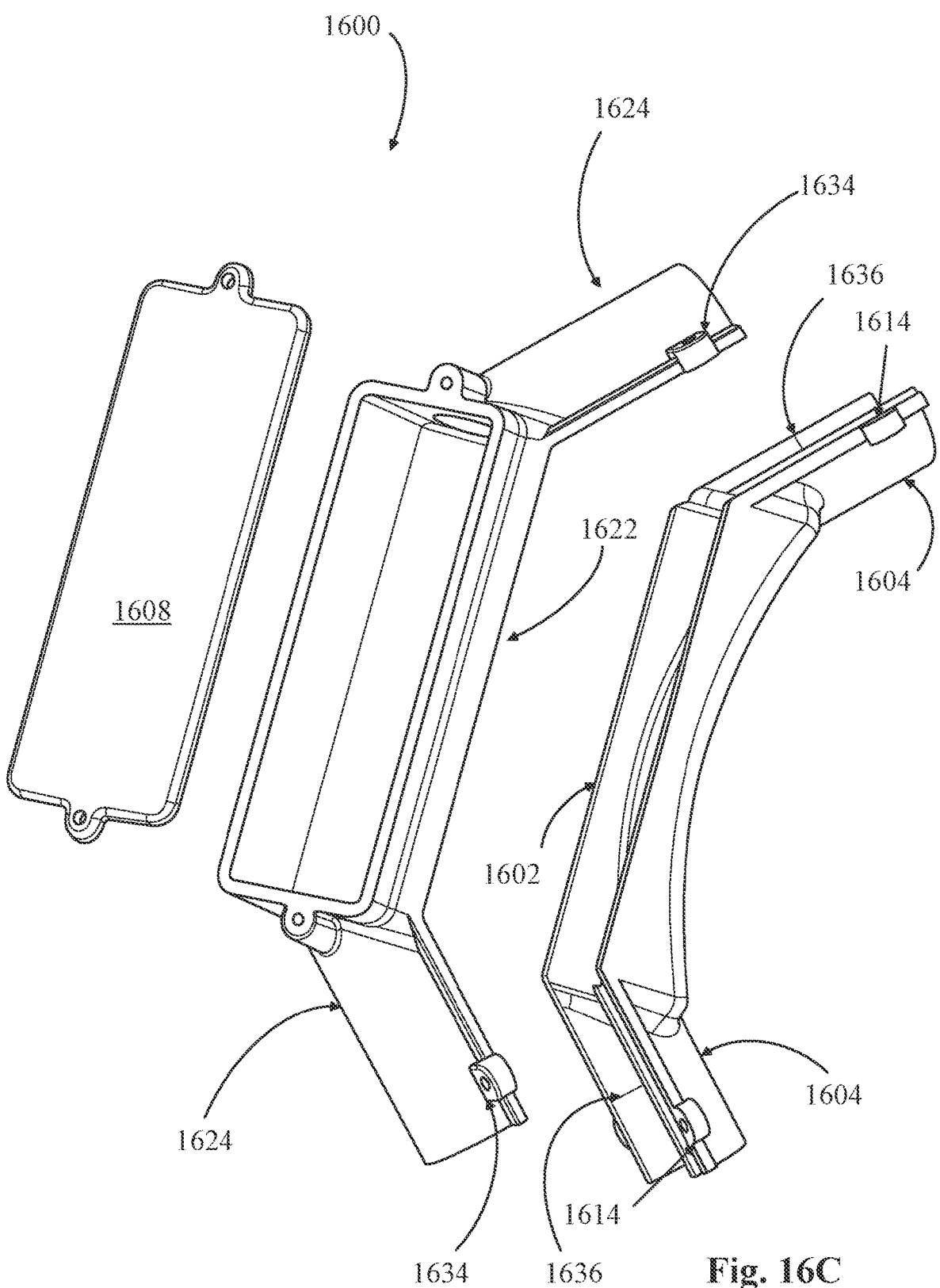
FIG. 16C illustrates a further example of an LU-body split conduit body according to an aspect of the present disclosure.

FIGS. 16A, 16B, and 16C provide examples of an LU configuration split conduit body 1600 that can also be oriented such that the hubs formed from partial hubs 1604, 1624 can provide a right angle as an LB, LL, or LR configuration conduit body. Therefore, the LU split conduit body 1600 can advantageously provide for 3 different configurations of a split conduit body through the manufacture of a single split body design, thereby reducing inventory and manufacturing demands. The LU split conduit body 1600 can be split into two partial bodies 1602 and 1622. Partial body 1602 includes partial hub 1604, and partial body 1622 includes a complimentary partial hub 1624 (shown in FIGS. 16B and 16C). Moreover, as shown in FIGS. 16B and 16C, the split conduit body 1600 can be split in different ways, and at different points. For example, in FIG. 16B, the conduit body 1600 is split into a right partial body 1602 and a left partial body 1622, creating a right partial hub 1604 and a left partial hub 1624. Accordingly, cover 1608 affixes to both right partial body 1602 and left partial body 1622. In contrast, as shown in FIG. 16C, the conduit body 1600 is split into a top partial body 1622 and a bottom partial body 1602, and creates a top partial hub 1624 and a bottom partial hub 1604. As a result, cover 1608 affixes to top partial body 1622 and not bottom partial body 1602 (although partial body 1602 can be provided with a separate cover as well). However, conduit body 1600 can be split in a number of different ways, and the split conduit bodies of FIGS. 16B and 16C provide examples thereof.

The partial hubs 1604 and 1624 each have anchors 1614 and 1634, respectively, to couple the partial bodies 1602 and 1622 together. Each partial hub 1604, 1624, however, is positioned at an angle with respect to the faces of the partial bodies 1602 and 1622, instead of projecting perpendicularly from the partial body 1602 or 1622. Additionally, and/or alternatively, the partial hubs 1604, 1624, may or may not be centered on a respective face of the partial body 1602, 1622 to which the partial 1604, 1624 is adjoined, and may project at an angle more towards one partial body (e.g., partial body 1602) than the other partial body (1622). Moreover, the partial hubs 1604 and 1624 can be provided with a conduit stop (e.g., conduit stop 1636) to assist insertion of a conduit into the split conduit body 1600. The LU split body 1600 can also be provided with a cover 1608 to allow for access to material contained by, running through, or being inserted into split conduit body 1600.

Figure 9:
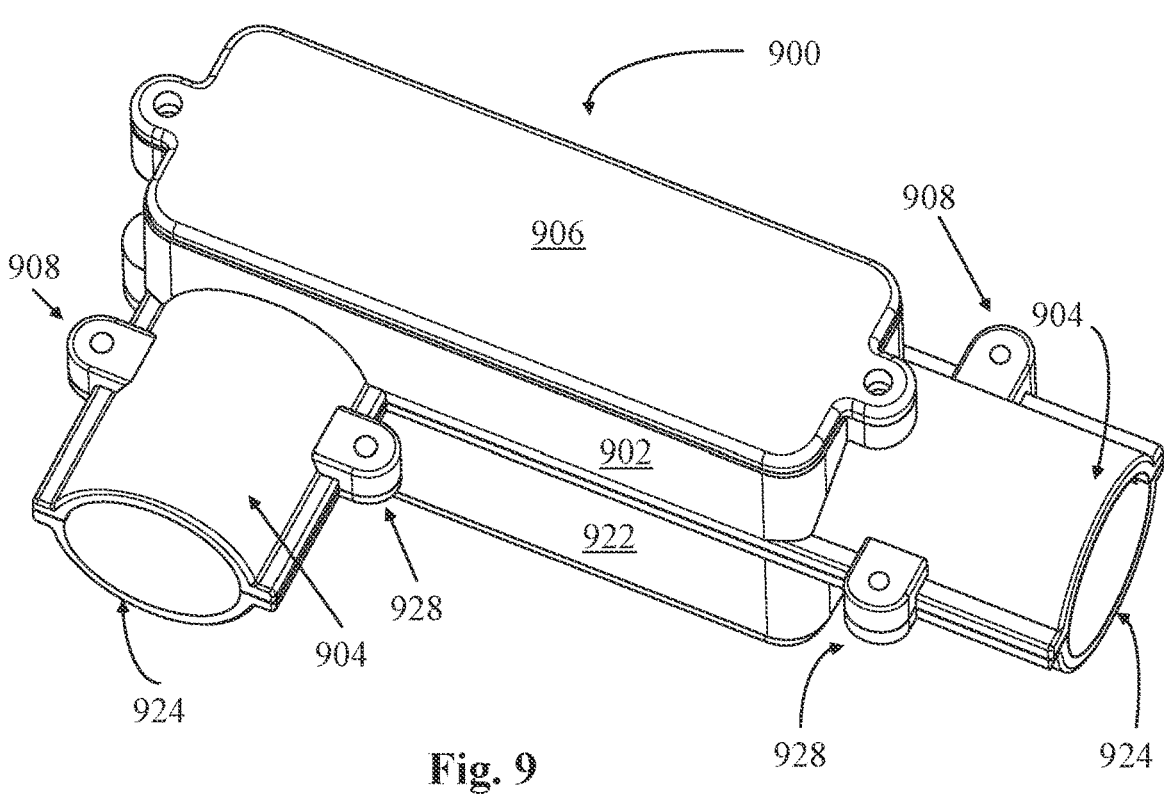
FIG. 9 illustrates an example of an LL-body split conduit body according to an aspect of the present disclosure.

FIG. 9 provides an example of an LL configuration split conduit body 900. LB, LL, and LR configuration can have two assembled hubs, which provide a 90 degree directional change to the bottom, left, or right directions, respectively. For instance, the split body 900 can include two partial bodies, 902 and 922. Partial body 902 includes partial hubs 904 and a cover 906. Partial body 922 can be complimentary to partial body 902, such that when partial body 922 is assembled with partial body 902, the coupling surfaces are provided in the same locations and/or such that partial body 922 can be mirror symmetrical to partial body 902. For example, partial hubs 924 of the partial body 922 can be mirror symmetrical to the partial hubs 904, such that a concentric circular hub can be provided when partial hubs 904 and 924 of respective partial bodies 902 and 922 are assembled together. Moreover, for the LB, LL, and/or LR configuration split conduit body 900, two partials hubs can be provided for each partial body 902, 922, with a first partial hub 904, 924 on a first end, and second partial hubs 904 and 924 perpendicular to the first partial hubs and projecting from a port at an end of a side of the partial bodies 902, 922. The partial body 902 can be assembled to the partial body 922 with the aid of anchors 908 and 928. One or more covers (e.g., cover 906) can also be utilized to provide increased flexibility in installation (e.g., allowing for rotation of the split body 900).

Figure 10:
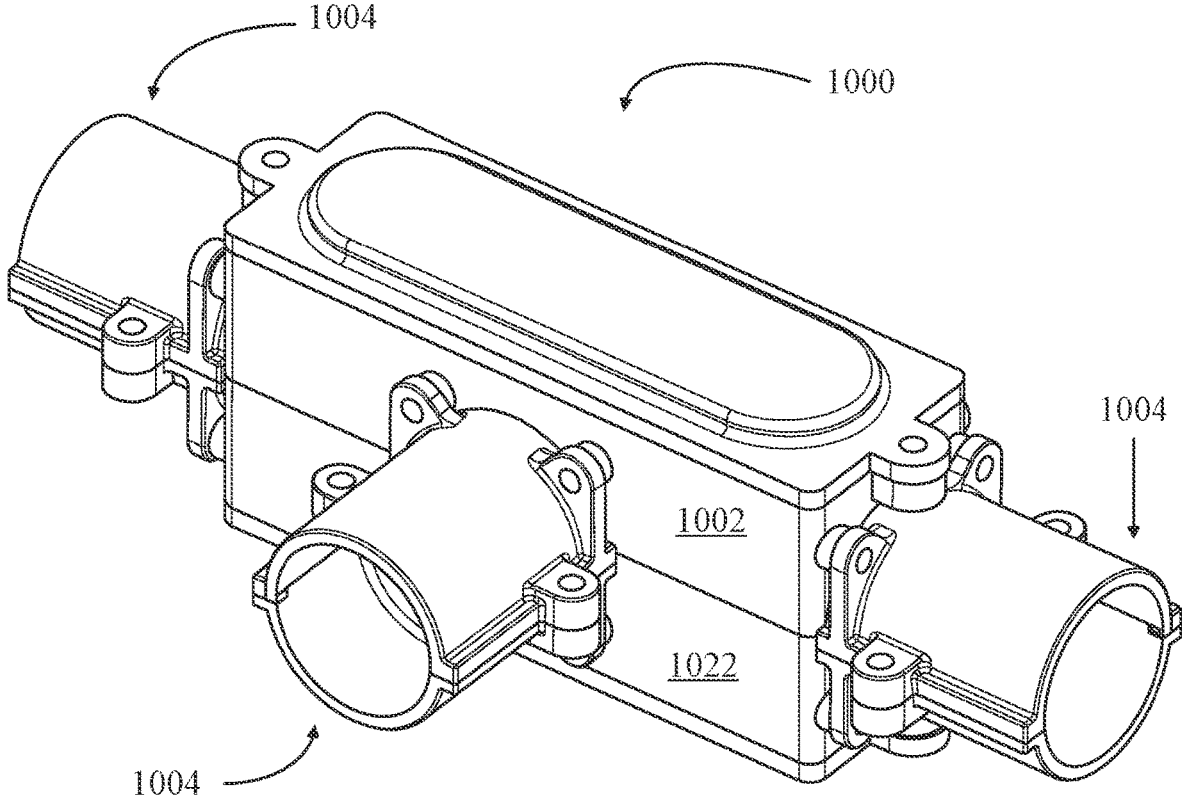
FIG. 10 illustrates an example of a split conduit body with modularity according to an aspect of the present disclosure.
Figure 11:
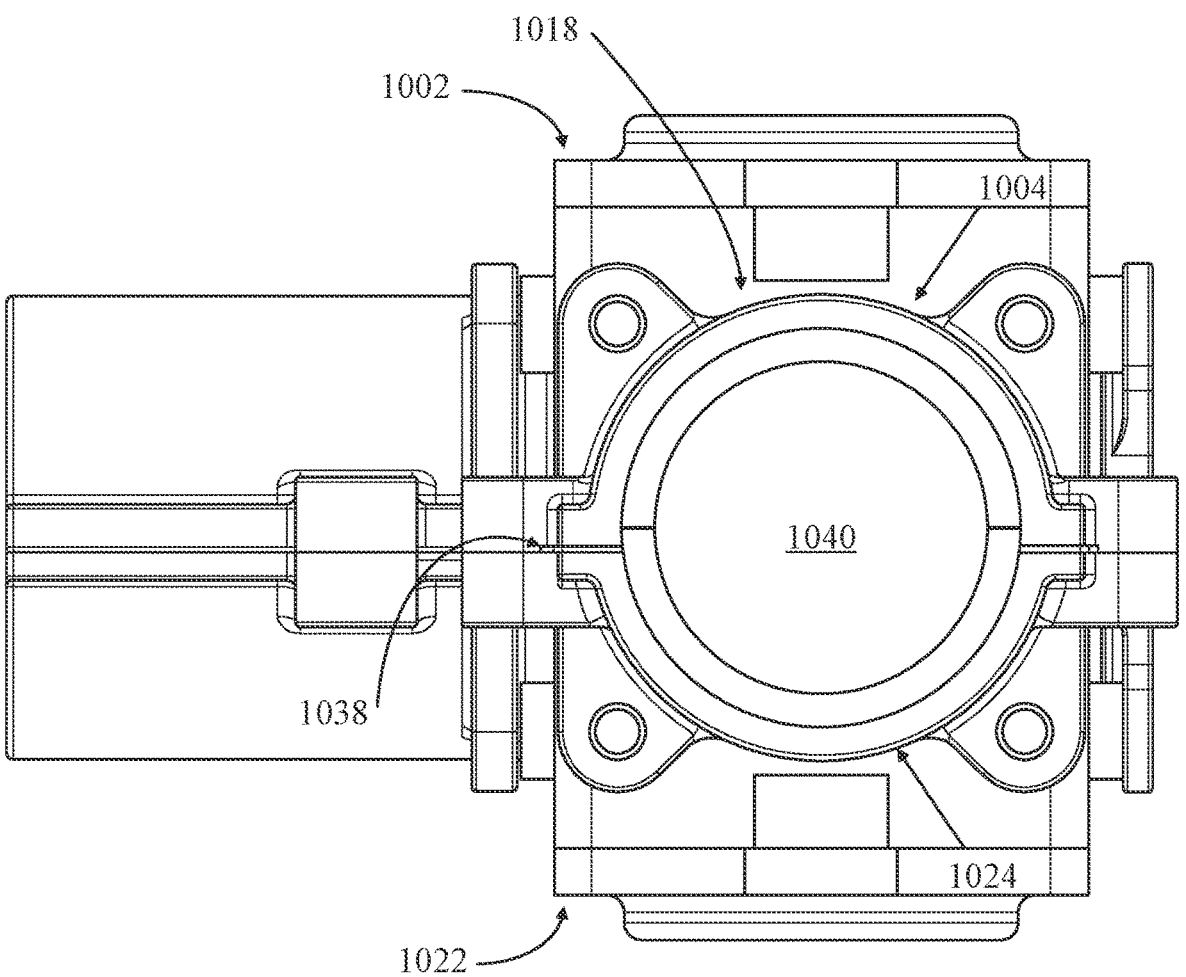
FIG. 11 illustrates a profile view of the split conduit body of FIG. 10.

The present disclosure also provides for split conduit bodies assembled from multiple bodies and/or components. For example, FIG. 10 provides an example of a split conduit body with modularity (e.g., assembled from modular components in a modular construction process). A modular split conduit body (e.g., split conduit body 1000) can be a split conduit body configured to construct any configuration of a conduit body (e.g., LR, LB, LL, C, E, or T design). The hubs of the conduit body can be a separate component of the split conduit body, can have a semicircular section, and can be joined with the modular main body (e.g., with screws). For instance, the split body 1000 can include a first body 1002 and a second body 1022. Partial hubs 1004 can be assembled (e.g., fixed) to the first body 1002, and the partial hub 1024 can be assembled to the second body 1022, at which point the first body 1002 includes the partial hubs 1004 and the second body 1022 includes the partial hub 1024. Additionally, and/or alternatively, as shown in FIG. 11, the partial hubs 1004 and 1024 can be assembled to each other (e.g., to a complimentary partial hub) with a gasket 1038 to form an assembled hub 1018 having an opening 1040 for receiving material, and then the assembled hub 1018 can be assembled to the first body 1002 and the second body 1022. This modularity can allow for partial hubs 1004 and 1024 to be used with a variety of different configurations of bodies 1002 and 1022.

Figure 12A:
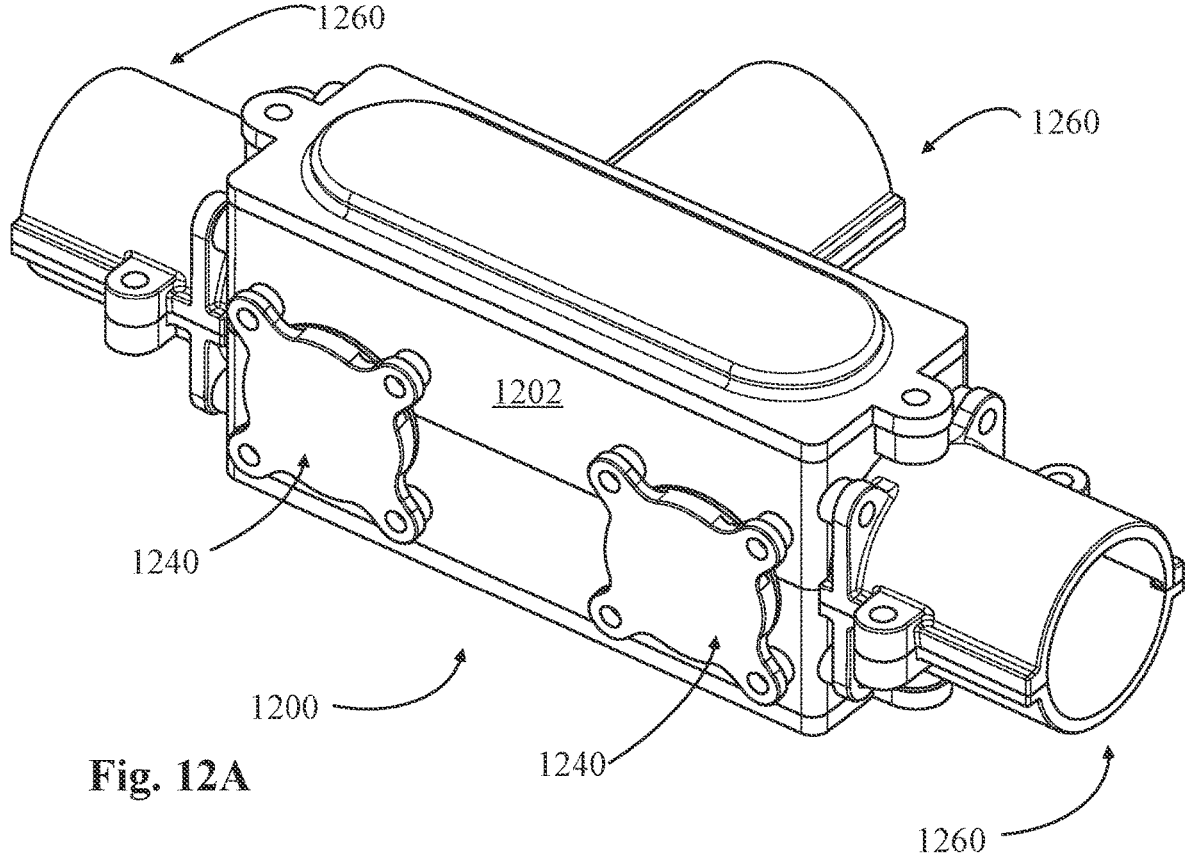
FIG. 12A illustrates an example of a split conduit body with modularity assembled with the components of FIGS. 12B-F according to an aspect of the present disclosure.
Figure 12B:
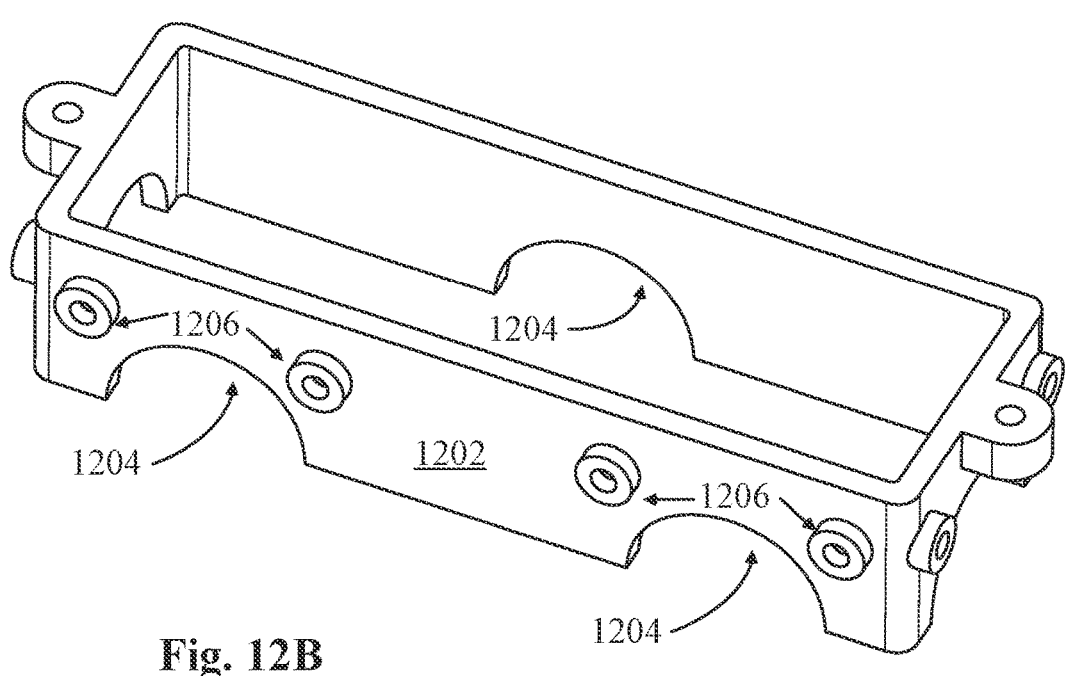
FIG. 12B illustrates an example of a top half body of a split conduit body with modularity according to an aspect of the present disclosure.
Figure 12C:
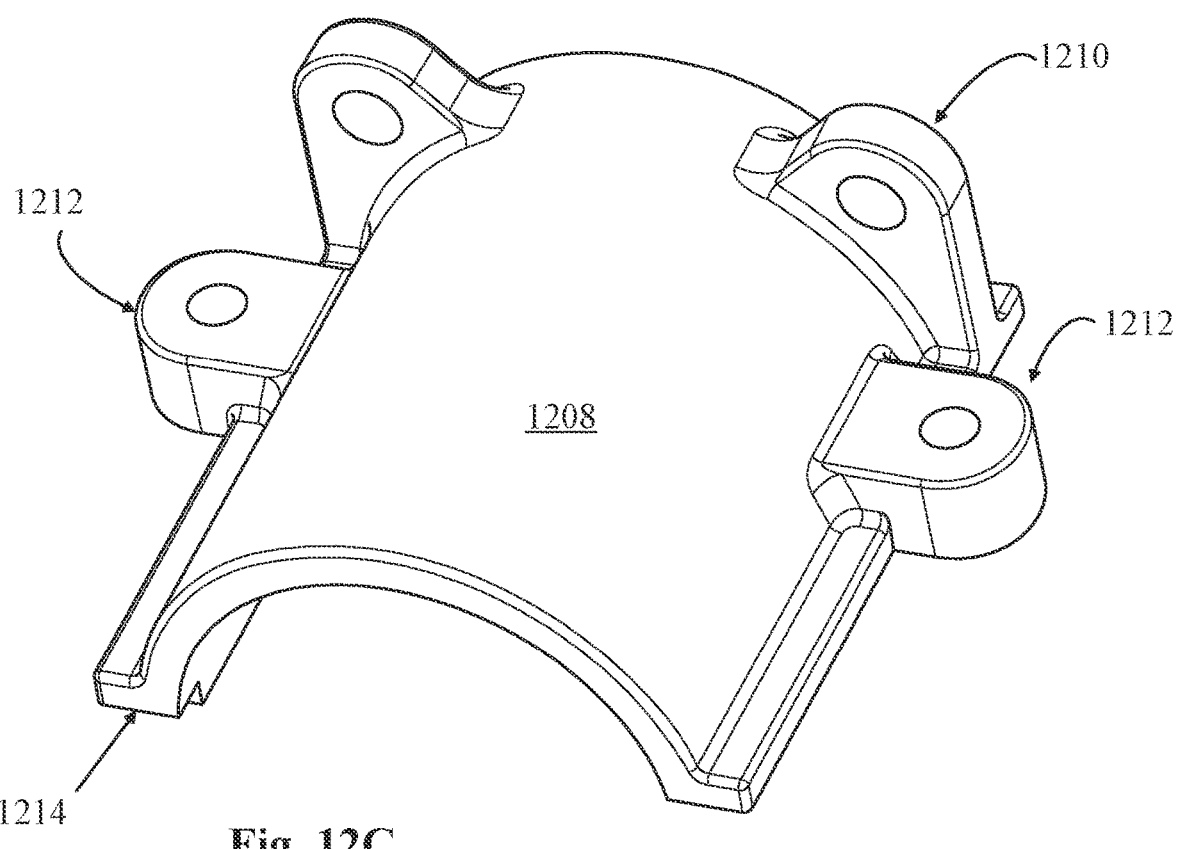
FIG. 12C illustrates an example of a top half hub of a split conduit body with modularity according to an aspect of the present disclosure.

For example, as shown in FIGS. 12A and 12B, a first body 1202 of the split conduit body 1200 can be provided with ports 1204 that are semicircular (e.g., the cut-out sections of the body). The first body 1202 can have ports 1204 at one or more sides of the first body 1202, and can have one or more ports 1204 on each side of the first body 1202. Each port 1204 can be accompanied by two or more bosses 1206 (e.g., screw bosses) oriented apart from each other (e.g., on different sides of the port 1204). The bosses 1206 can be provided with screw threads or could be unthreaded for a thread-forming screw to assemble. As shown in FIG. 12C, a partial hub 1208 (e.g., a conduit hub halve) can be constructed with a semicircular shape (e.g., to correspond to the shape of port 1204) with flanges 1210 to connect to the first body 1202 (e.g., via bosses 1206) and bosses 1212 to assemble (e.g., connect) to the matching hub half. The coupling surface 1214 between hub halves can also be formed as a flange for gasket seating (e.g., gasket 1238 of FIG. 12D).

Figure 12D:
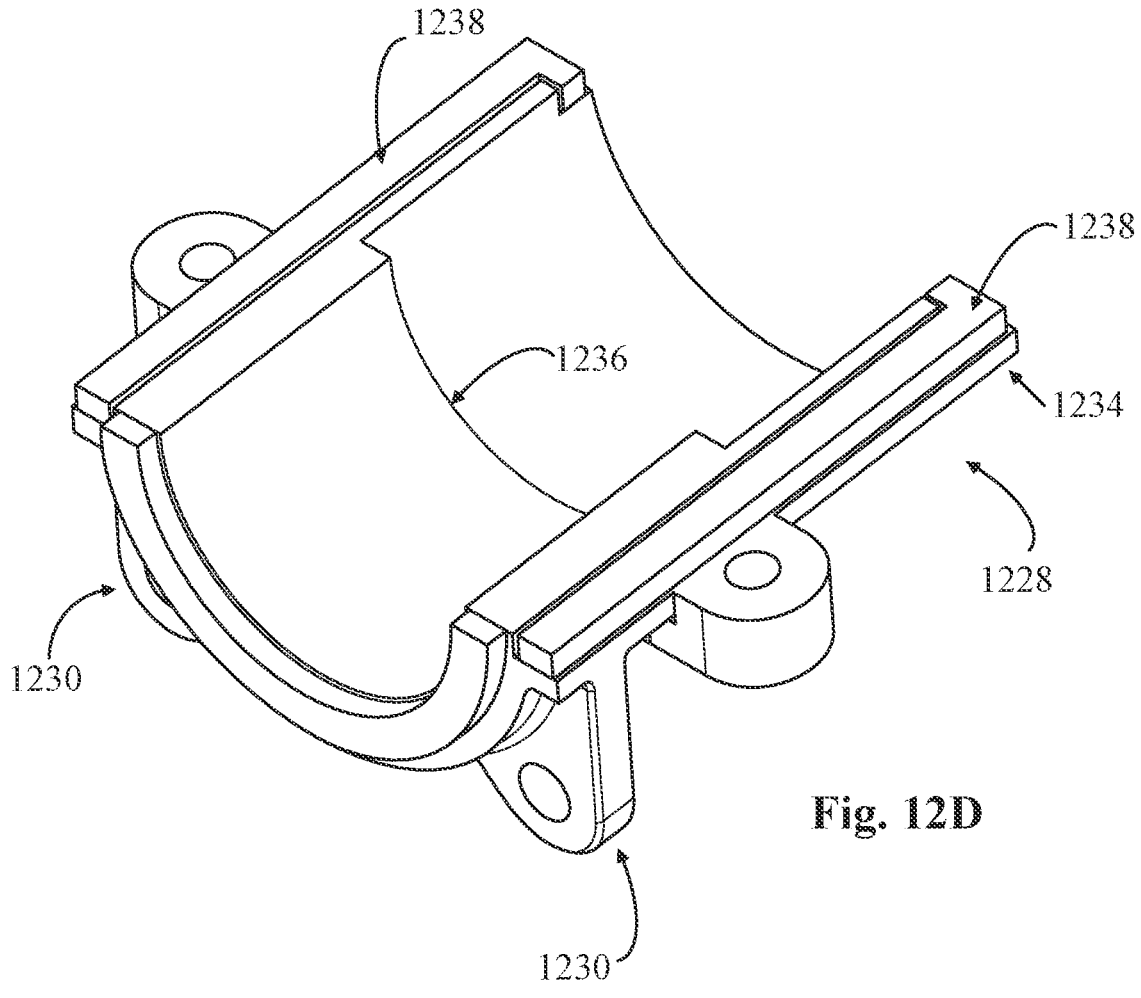
FIG. 12D illustrates an example of a bottom half hub of a split conduit body with modularity according to an aspect of the present disclosure.
Figure 12E:
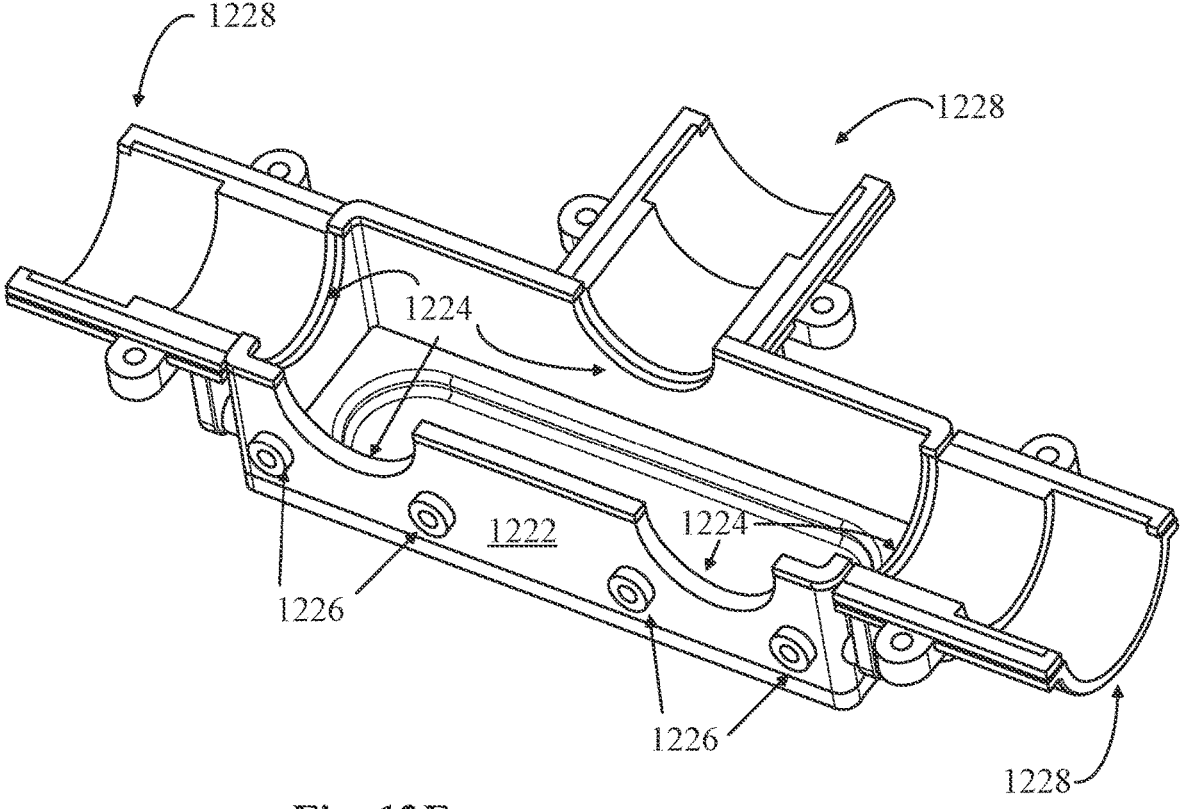
FIG. 12E illustrates an example of a bottom half body with bottom half hubs of a split conduit body with modularity according to an aspect of the present disclosure.
Figure 12F:
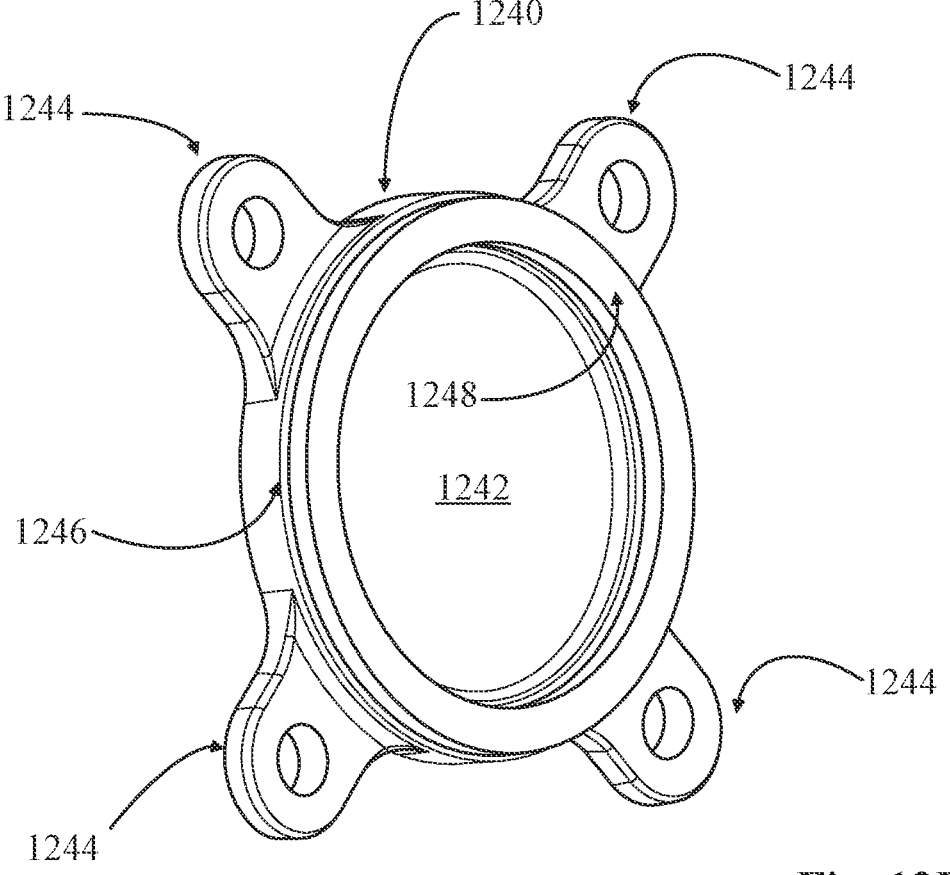
FIG. 12F illustrates an example of a port cover for a split conduit body with modularity according to an aspect of the present disclosure.

As shown in FIGS. 12D and 12E, flanges 1230 on the hub halves (e.g., partial hub 1228, and at least due to the similar structures, corresponding partial hub 1208) can be designed to correspond to (e.g., match with) the bosses 1226 on the partial body 1222. The partial hub 1228 can be provided with the gasket 1238 at the intersection (e.g., at the coupling surface 1234) with the matching partial hub 1208, and also at the coupling surface 1214 with the first body 1202. The bottom and top hub halves (e.g., partial hub 1208 and 1228) can also be provided with a conduit stop 1235, and/or step and matching groove which can provide for 360 degree contact for the assembled hub 1204 (e.g., similar to step 256 and groove 258).

The partial hubs can then be assembled to their respective conduit bodies (e.g., using the bosses 1206, 1226 and flanges 1210, 1230). For example, as shown in FIG. 12E, each partial hub 1228 can be assembled to the second body 1222 at a port 1224. Additionally, and/or alternatively, some ports 1224 can be left alone, without a partial hub 1228 being assembled at the port 1224. The same assembly of partial hubs 1208 to ports 1204 can be similarly performed for the first body 1202, and the assembled first body 1202 and second body 1222 can be assembled (e.g., fastened) to each other to form split conduit body 1200 (e.g., similar to the assembly of split conduit body 200). When ports 1204 and/or 1224 are left without a corresponding hub, a port cap 1240 can be assembled to the split conduit body 1200. For example, the port cap 1240 can have a face 1242 that covers the opening formed by assembling port 1204 and 1224, flanges 1244 for assembling to the bosses 1206, 1226 of the assembled partial bodies 1202 and 1222 (respectively), and a coupling surface 1246 which can include a gasket 1248 for providing a seal with the split conduit body 1200 around the opening formed by assembling ports 1204, 1224.

With a modular construction utilizing modular partial bodies (e.g., partial bodies 1202 and 1222) and a combination of partial hubs (e.g., partial hubs 1208, 1228) and port caps (e.g., port cap 1240), a variety of configurations of split conduit bodies can be achieved. For example, using a split conduit body with a cover 1250 assembled to a top side of a partial body 1202, a cover assembled to a bottom side of a partial body 1222 (such that a cover 1250 is positioned on opposite sides of a split conduit body 1220), and 5 ports 1204 (e.g., a port on a first end, a port on an opposite second end, a port on a lateral side, and two ports on an opposite lateral side) on each partial body, the hubs and port caps can be positioned at different assembled openings to achieve each different configuration of split conduit bodies.

Figure 13:
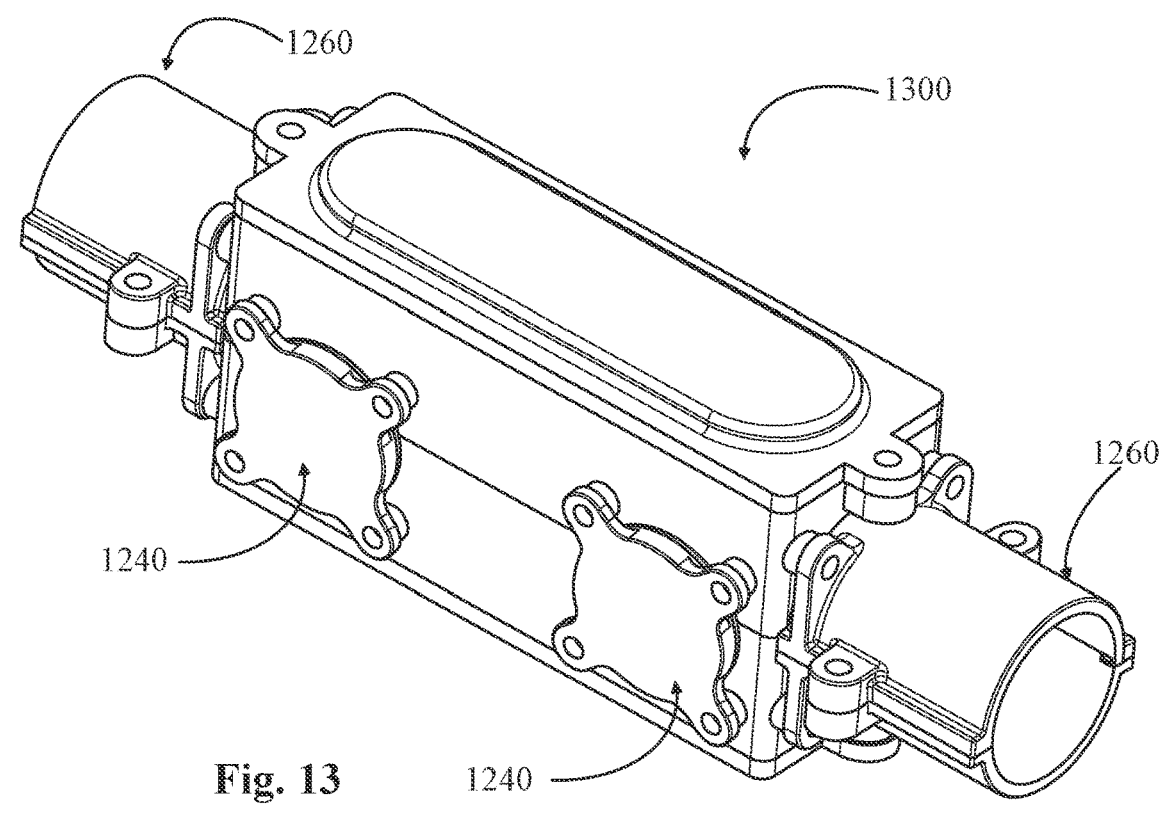
FIG. 13 illustrates an example of a C-body split conduit body with modularity according to an aspect of the present disclosure.
Figure 14:
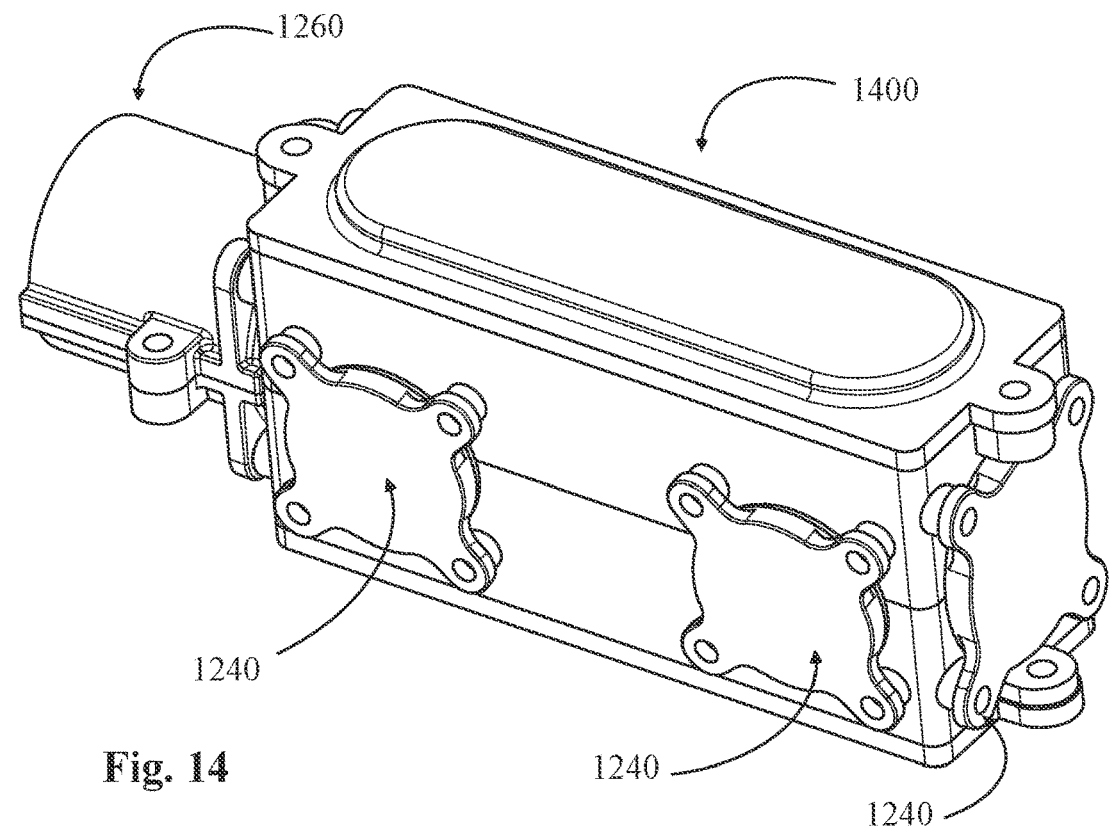
FIG. 14 illustrates an example of an E-body split conduit body with modularity according to an aspect of the present disclosure.
Figure 15A:
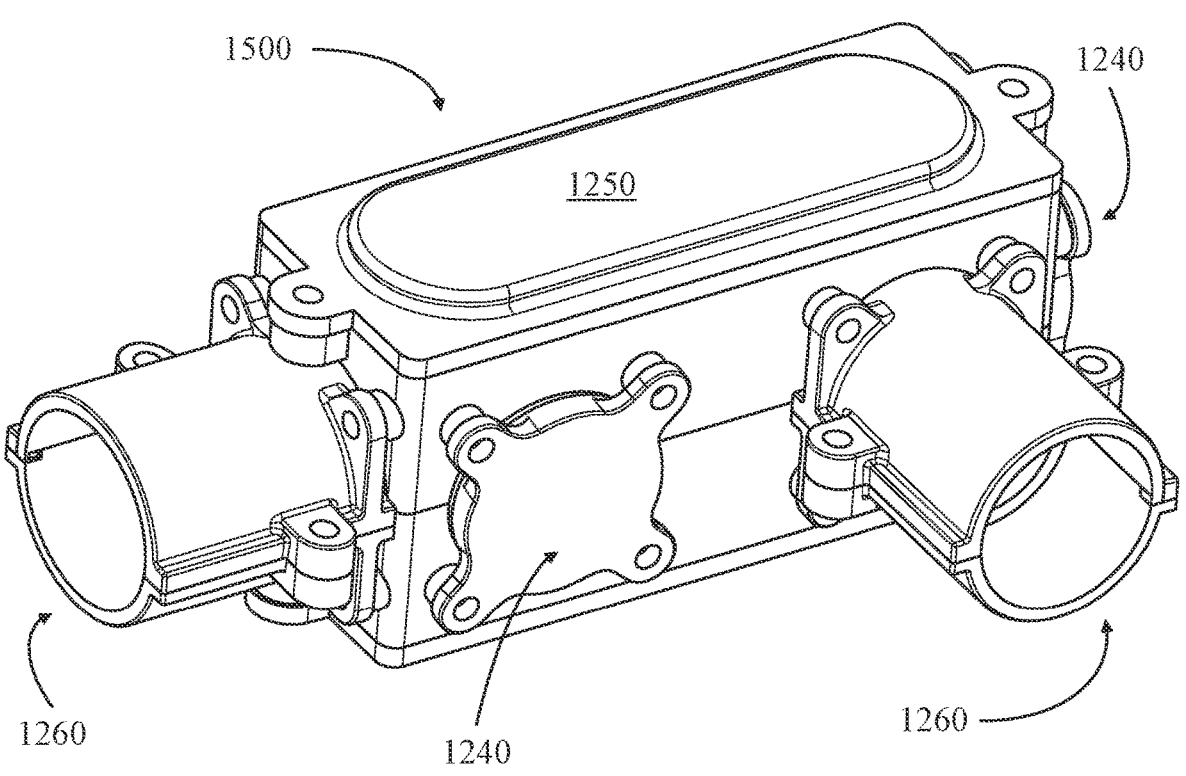
FIG. 15A illustrates an example of an LL-body split conduit body with modularity according to an aspect of the present disclosure.
Figure 15B:
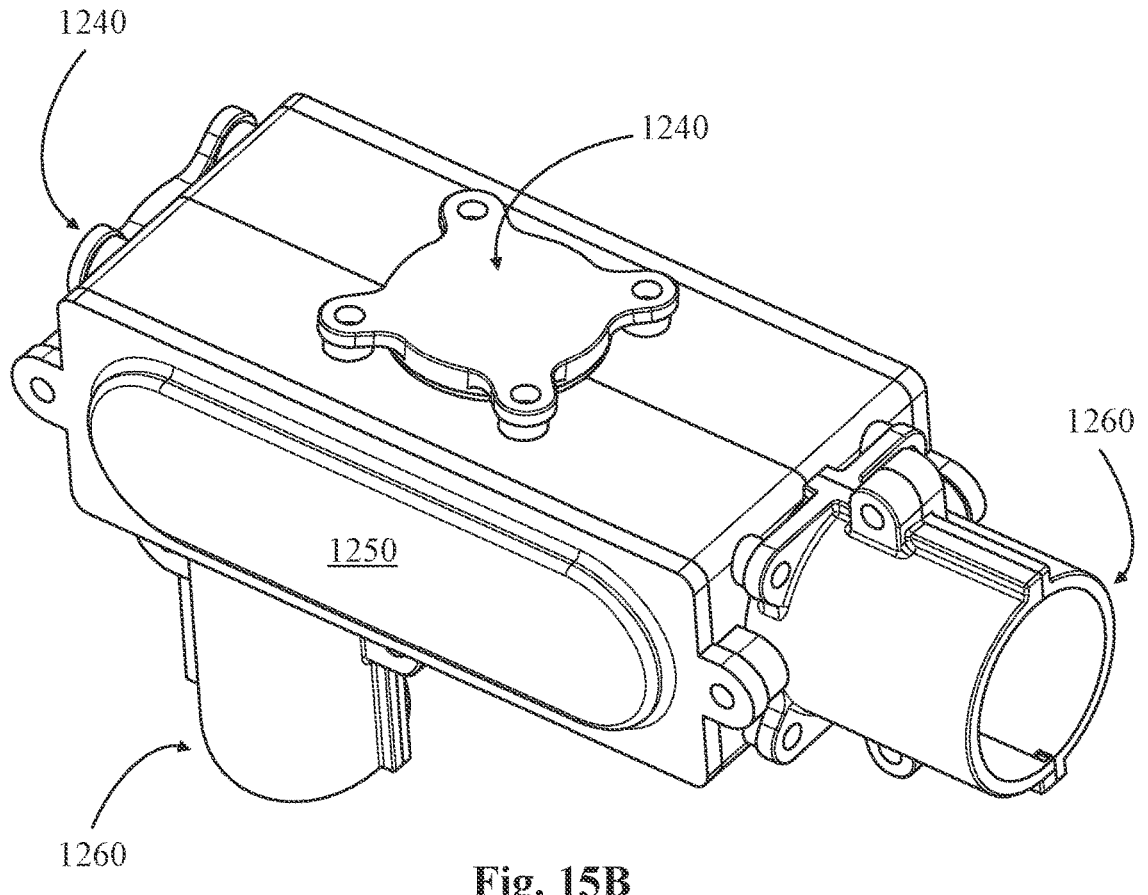
FIG. 15B illustrates an example of an LB-body split conduit body with modularity according to an aspect of the present disclosure.

For example, as shown in FIG. 12A, a T configuration split conduit body 1200 can be achieved using two port caps 1240 on a first lateral side, an assembled hub 1260 on an opposite lateral side, and an assembled hub 1260 on either end of the assembled body of the split conduit body 1200. As shown in FIG. 13, a C configuration split conduit body 1300 can be achieved using two ports caps 1240 on a first lateral side, a port cap on an opposite lateral side, and an assembled hub 1260 on either end of the assembled body of the split conduit body 1300. As shown in FIG. 14, an E body configuration split conduit body 1400 can be achieved using two port caps 1240 on a lateral side, a port cap on an opposite lateral side, an assembled hub 1260 on a first end, and a port cap 1240 on an opposite end of the assembled body of the split conduit body 1500. As shown in FIGS. 15A and 15B, an LL-LB configuration split conduit body 1500 can be achieved using one port cap 1240 and one assembled hub 1260 on a first lateral side, a port cap 1240 on a second, opposite lateral side, an assembled hub 1260 on a first end, and a port cap 1240 on an opposite end of the assembled body of the split conduit body 1500. Whether the split conduit body 1500 is an LL or LB configuration can then be determined by its rotation, and the rotation aspect can be aided through the use of both covers 1250 on the top and bottom of the split conduit body 1500. Moreover, split conduit body 1500 may be shown with an assembled hub 1260 on a distal end of a lateral side relative to the other assembled hub 1260, however, the two assembled hubs 1260 may also be positioned at the ports adjacent to each other (e.g., by swapping the port cap 1240 and assembled hub 1260 on the first lateral side).

As shown in FIGS. 2 and 12A-12F, for example, a split conduit body can be assembled from a top and bottom body (e.g., two half bodies) or a plurality of pieces and/or bodies. For example, a top body may itself be split into halves and assembled into a single top half body (e.g., to provide different combinations of top bodies with different numbers or ports). For instance, a top body may be assembled from two halves that are each a lateral side of the same top body. One half of a top body on a first lateral side can omit all ports, while the other half can include a single or a plurality of ports. By providing for the ability to configure each specific side of the split conduit body, the split conduit body can provide further modularity, while increasing the number of components to be manufactured. This assembled top half can then be fixed to an single, integral bottom body (e.g., bottom body 222) or a modular bottom body similarly assembled from separate halves. As a result, a main body of the split conduit body may be assembled from the multiple separate partial bodies.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A conduit body, the conduit body comprising:
a first body of the conduit body comprising a first coupling surface, a first hub configured to receive a further conduit on a first side of the conduit body, and a first port on the first side of the conduit body; and
a second body of the conduit body comprising a second coupling surface, a second hub complimentary to the first hub configured to receive the further conduit on the first side of the conduit body, and a second port on the first side of the conduit body complimentary to the first port,
wherein the first hub is configured to couple to the second hub, and the first coupling surface is configured to couple to the second coupling surface to such that the first body is coupled to the second body,
wherein the first body comprises an opening on a third side, and
wherein the conduit body further comprises a cover configured to couple to the first body on the third side and cover the opening.

2. The conduit body of claim 1, wherein the first body further comprises:
a first main body, the first main body comprising the first port on the first side of the conduit body and the first hub being integrally formed with an edge of the first port on the first side of the conduit body and projecting away from the first port, and
wherein the second body further comprises:
a second main body, the second main body comprising the second port on the first side of the conduit body and the second hub being integrally formed with an edge of the second port on the first side of the conduit body and projecting away from the second port; and
wherein the second hub is configured to be affixed to the first hub.

3. The conduit body of claim 2, wherein the first hub and the second hub comprise a same first internal cross section area in a first length, and a same second internal cross section area in a second length.

4. The conduit body of claim 1, wherein the first body further comprises a third port and a first hub on a second side of the conduit body, and
wherein the second body of the conduit body further comprises a fourth port and a second hub on the second side of the conduit body, and
wherein the first coupling surface is further configured to couple to the second coupling surface such that third port is coupled to the fourth port and the first hub on the second side is coupled to the second hub on the second side.

5. The conduit body of claim 1, wherein the first body is a top half of the conduit body and the second body is a bottom half of the conduit body, or the first body is a front half of the conduit body and the second body is a back half of the conduit body.

6. The conduit body of claim 1, the conduit body further comprising a gasket, wherein the first coupling surface is configured to couple to the second coupling surface while applying a force to the gasket.

7. The conduit body of claim 1, wherein the first body further comprises a first connection anchor configured to receive a screw, and the second body further comprises a second connection anchor configured to receive the same screw.

8. The conduit body of claim 1, wherein the first body further comprises:
a first main body, wherein the first main body is affixed to the first hub at a first port connection surface, and
wherein the second body further comprises:
a second main body, wherein the second main body is affixed to the second hub at a second port connection surface.

9. The conduit body of claim 8, wherein the first hub is configured to be affixed to the second hub to form an assembled hub.

10. The conduit body of claim 8, wherein the first main body comprises a plurality of first ports, and the second main body comprises a complimentary plurality of second ports, wherein each first port is coupled to a respective second port to form a plurality of openings in at least one lateral side of the conduit body.

11. The conduit body of claim 10, further comprising at least one port cover, wherein the at least one port cover is affixed to at least one further first port connection surface and at least one further second port connection surface.

12. The conduit body of claim 11, wherein a gasket is provided at the first port connection surface or the at least one further second port connection surface.

13. The conduit body of claim 11, wherein the at least one port cover is interchangeable with the assembled hub.

14. A method for installing a conduit body, the method comprising:

providing a material inside a first body of the conduit body comprising a first coupling surface and a first hub configured to receive a further conduit on a first side of the conduit body, the first body forming a first port on the first side of the conduit body;

aligning, with the first body, a second body of the conduit body comprising a second coupling surface and a second hub complimentary to the first hub configured to receive the further conduit on the first side of the conduit body, the second body forming a second port on the first side of the conduit body complimentary to the first port; and coupling the first hub to the second hub, and the first body to the second body, around the material using the first coupling surface and the second coupling surface, wherein the first body comprises an opening on a third side, and wherein the conduit body further comprises a cover configured to couple to the first body on the third side and cover the opening.

15. The method of claim 14, further comprising:

coupling the first body to the further conduit by inserting the further conduit into the first hub of the first body; and coupling the second body to the first body and the further conduit.

16. The method of claim 15, wherein inserting the further conduit into the first hub further comprises:

inserting the further conduit into less than the full length of the first hub such that the further conduit abuts a conduit stop of the first hub, wherein the conduit stop defines a change in an internal cross section area of the first hub.

17. The method of claim 15, further comprising:

removing a first portion of the further conduit previously inserted into a previous hub; and preparing a remaining second portion of the further conduit, wherein coupling the first body to the further conduit by inserting the further conduit into the first hub of the first body further comprises:

inserting the remaining second portion into the first hub of the first body.

18. The method of claim 14, further comprising:

coupling the first hub to the first body at a first port on a first side of the first body;

coupling the second hub to the second body at a second port corresponding to the first port on a same first side of the second body; and coupling a port cover to the first body at a third port on a second side of the first body and to the second body at a fourth port corresponding to the third port on a same second side of the second body.

19. A system for replacing a conduit body, the system comprising:

a material of the system, a replacement conduit body, the replacement conduit body comprising:

a first body comprising a first coupling surface, a first hub on a first side of the conduit body, and a first port on the first side of the replacement conduit body, the first hub aligned with the first port and configured to receive a further conduit; and a second body comprising a second coupling surface, a second hub complimentary to the first hub on the first side of the conduit body, and a second port on the first side of the replacement conduit body complimentary to the first port, the second hub aligned with the second port and configured to receive the further conduit;

wherein the first coupling surface is configured to couple to the second coupling surface such that the first body is coupled to the second body, wherein the first body comprises an opening on a third side, and wherein the conduit body further comprises a cover configured to couple to the first body on the third side and cover the opening, and the further conduit, the further conduit corresponding in shape to an inner wall of the first hub and the second hub and configured to carry the material through the further conduit.

* * * * *